United States Patent
So et al.

(10) Patent No.: US 10,037,630 B2
(45) Date of Patent: Jul. 31, 2018

(54) AGRICULTURAL MACHINE PERFORMANCE IMPROVEMENT SYSTEM

(71) Applicant: Deere & Company, Moline, IL (US)

(72) Inventors: Chung Yin So, Urbandale, IA (US); Beth Kamp, Rhineland-Pfalz (DE); Brian R. Boelens, Atkinson, IL (US); Stewart J. Moorehead, Champaign, IL (US); Margaux M. Price, Waukee, IA (US); Nathan A. Mariman, Geneseo, IL (US); Grant J. Wonderlich, Milan, IL (US); Julian Sanchez, Champaign, IL (US); Charles A. Conway, Champaign, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/987,205

(22) Filed: Jan. 4, 2016

(65) Prior Publication Data
US 2017/0193713 A1     Jul. 6, 2017

(51) Int. Cl.
| | | |
|---|---|---|
| G06F 19/00 | (2018.01) | |
| G07C 5/00 | (2006.01) | |
| G05B 19/042 | (2006.01) | |
| A01C 7/08 | (2006.01) | |
| A01C 7/04 | (2006.01) | |
| G07C 5/08 | (2006.01) | |

(52) U.S. Cl.
CPC ............ *G07C 5/006* (2013.01); *A01C 7/046* (2013.01); *A01C 7/08* (2013.01); *G05B 19/042* (2013.01); *G07C 5/0808* (2013.01)

(58) Field of Classification Search
CPC ...... G07C 5/006; G07C 5/0808; A01C 7/046; A01C 7/08; G05B 19/042

USPC ........................................................ 701/32.7
See application file for complete search history.

(56) References Cited

U.S. PATENT DOCUMENTS

| | | | | |
|---|---|---|---|---|
| 9,686,902 | B2* | 6/2017 | Thomson | A01B 63/112 |
| 2003/0025678 | A1* | 2/2003 | Lee | G06F 3/0488 |
| | | | | 345/173 |
| 2005/0087378 | A1* | 4/2005 | Hrazdera | B60C 23/00 |
| | | | | 180/170 |
| 2010/0070145 | A1* | 3/2010 | Foster | A01B 79/005 |
| | | | | 701/50 |

(Continued)

FOREIGN PATENT DOCUMENTS

| | | |
|---|---|---|
| WO | 2011064453 A1 | 6/2011 |
| WO | 2013076077 A1 | 5/2013 |
| WO | 2015188898 A1 | 12/2015 |

OTHER PUBLICATIONS

Palmroth L et al."Intelligent coaching of mobile working machine operators", Intelligent Engineering Systems, 2009. INES 2009. Apr. 16, 2009. International Conference on, IEE, Piscataway, NJ, USA.

(Continued)

*Primary Examiner* — Muhammad Shafi
(74) *Attorney, Agent, or Firm* — Joseph R. Kelly; Kelly, Holt & Christenson PLLC

(57) ABSTRACT

An issue is detected in the operation of a mobile machine. A user interaction system is triggered, and identifies an issue-specific process based on the detected issue. Information is surfaced for an operator to perform actions to address the issue. The actions are grouped based on whether they can be performed inside or outside an operator compartment.

17 Claims, 26 Drawing Sheets

(56) References Cited

U.S. PATENT DOCUMENTS

| | | | |
|---|---|---|---|
| 2012/0050183 A1* | 3/2012 | Lee .................... | G06F 3/1423 |
| | | | 345/173 |
| 2014/0172247 A1* | 6/2014 | Thomson ............. | A01B 63/112 |
| | | | 701/50 |
| 2014/0330604 A1 | 11/2014 | Connolly et al. | |
| 2015/0081162 A1* | 3/2015 | Mitchell ............... | B60W 40/09 |
| | | | 701/32.4 |
| 2015/0199360 A1 | 7/2015 | Pfeiffer et al. | |
| 2015/0376868 A1* | 12/2015 | Jackson ................ | E02F 9/2025 |
| | | | 701/50 |
| 2016/0088787 A1* | 3/2016 | Connell ................. | A01B 76/00 |
| | | | 701/50 |
| 2016/0139003 A1* | 5/2016 | Posselius ............ | G01M 17/013 |
| | | | 700/276 |

OTHER PUBLICATIONS

European Search Report in foreign counterpart application No. 16206782.1 dated Apr. 6, 2017 (9 pages).

\* cited by examiner

AGRICULTURAL MACHINE PERFORMANCE IMPROVEMENT SYSTEM

FIELD OF THE DESCRIPTION

The present description relates to mobile machines. More specifically, the present description relates to a system for improving the performance of a mobile machine.

BACKGROUND

There are many different types of mobile machines. Some such machines can include, for instance, agricultural machines, construction machines, turf management machines, machines used in forestry, among others. Some machines have subsystems that perform a variety of different functions. The way the subsystems are controlled can affect the overall performance of the mobile machine, or the performance of the individual subsystems.

One example of a mobile machine is an agricultural planting machine (or planter). When an operator encounters issues when attempting to operate a planter, those issues can directly impact yield. For example, improper seed spacing or planting depth can lead to less robust plants, and even plants that are missing.

Planters can be controlled in many different ways. When an operator encounters an issue with the planter, the operator can sometimes need to know what changes to make, relatively quickly, in order to keep the planter operating at a high performance level. Some systems have recently been developed which allow the operator to increase the planter speed. This means that the operator has less time to diagnose issues, and improper settings can affect much larger areas of the field being planted, when not addressed quickly.

The discussion above is merely provided for general background information and is not intended to be used as an aid in determining the scope of the claimed subject matter.

SUMMARY

An issue is detected in the operation of a mobile machine. A user interaction system is triggered, and identifies an issue-specific process based on the detected issue. Information is surfaced for an operator to perform actions to address the issue. The actions are grouped based on whether they can be performed inside or outside an operator compartment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
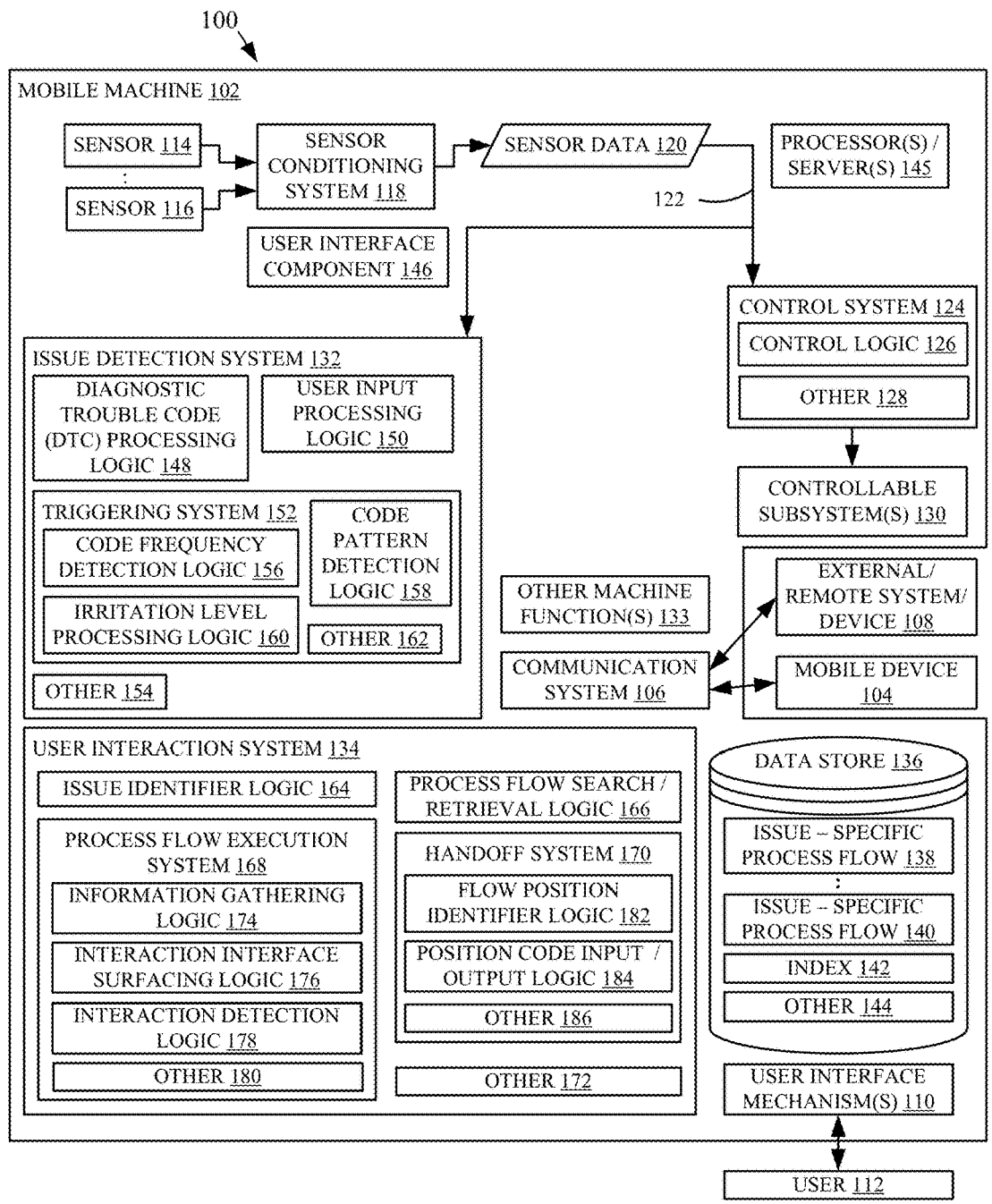
FIG. 1 is a block diagram of one example of a mobile machine architecture.

FIG. 1 shows one example of a mobile machine architecture 100. Architecture 100 illustratively includes mobile machine 102 that can communicate with a mobile device 104 (such as a smartphone) and one or more external or remote systems or devices 108 using a communication system 106. Communication system 106 can be a near field communication system, a different type of wireless communication system (such as a cellular communication system, or a wide variety of wired or other wireless communication systems, some of which are described in greater detail below).

Machine 102 also illustratively includes one or more user input mechanisms 110 that can be actuated by user 112 in order to control and manipulate mobile machine 102. User input mechanisms 110 can include, for instance, levers, steering wheels, push buttons, switches, pedals, joysticks, or a wide variety of other types of mechanisms. Similarly, they can include user actuatable display elements on a user interface screen. Such elements can include buttons, icons, links, drop down menus, textboxes, or a wide variety of other user input mechanisms. Other examples of user input mechanisms are described in greater detail below.

In one example, mobile machine 102 includes a plurality of sensors 114-116 that illustratively sense a variety of different types of variables and provide output signals to sensor conditioning system 118. The signals are illustratively conditioned (such as amplified, linearized, compensated, etc.) and provided as sensor data 120. Sensor data 120 can be provided over a communication link (such as a controller area network (CAN) bus or another link) 122 to a variety of other components of mobile machine 102. In one example, they are provided to control system 124 which includes control logic 126, and can include other items 128. Control system 124 illustratively generates control signals to control one or more controllable subsystems 130 on mobile machine 102.

Sensor data 120 can also be provided to issue detection system 132 which can detect issues that are affecting the performance of mobile machine 102, based upon the sensor data 120. When an issue is detected, issue detection system 132 illustratively provides an indication of that to user interaction system 134. User interaction system 134 illustratively accesses data store 136 which stores one or more issue-specific process flows 138-140. Process flows 138-140 can be indexed by index 142. Data store 136 can include other items 144 as well.

User interaction system 134 illustratively runs the issue-specific process flow retrieved from data store 136, corresponding to the detected issue. It can generate user interface displays or other user outputs on user interface mechanisms 110, using a user interface component 146. In doing so, it can instruct user 112 to perform a variety of different actions that may be useful in addressing the detected issue. In one example, user interaction system 134 illustratively instructs user 112 to first perform actions that can be taken from within an operator compartment of machine 102. After those are taken, if the issue is still unresolved, then user interaction system 134 illustratively hands off the issue-specific process flow to mobile device 104 so that user 112 can take mobile device 104 out of the cab to perform other actions. Mobile device 104 illustratively picks up the issue-specific process flow where user interaction system 134 left off, and continues to surface interfaces that instruct the user 112 to perform actions, which may help to address the issue, and which are performed outside of the cab.

If the issue is still not resolved, then a communication can be automatically, or manually, sent to a support person, such as a dealer, a repair organization, etc. If the issue is resolved, then the resolution can be saved for use in later processing (such as in machine learning or other processing that correlates issues to resolutions). This is described in greater detail below.

It will be noted that, in one example, mobile machine 102 also illustratively includes one or more processors or servers 146, and it can include other machine functions 133. Processors or servers 146 can be used to facilitate the operation of various functions performed on mobile machine 102.

Before describing the operation of architecture 100 in more detail, a description of some of the items in issue detection system 132 and user interaction system 134 will first be provided. Issue detection system 132 illustratively includes diagnostic trouble code (DTC) processing logic 148, user input processing logic 150, triggering system 152, and it can include other items 154. DTC processing logic 148 illustratively receives sensor data 120 and processes it to identify whether any diagnostic trouble codes should be generated and surfaced (e.g., displayed, audibly surfaced, surfaced by a haptic feedback system, etc.) for user 112. User input processing logic 150 illustratively detects user inputs on one or more user input mechanisms 110, and identifies potential issues based on those inputs. Triggering system 152 illustratively receives information from DTC processing logic 148 and user input processing logic 150 and determines whether it should trigger user interaction system 134 to being running an issue-specific process flow to help the user 112 address any issues which have been detected.

Triggering system 152, itself, illustratively includes code frequency detection logic 156, code pattern detection logic 158, irritation level processing logic 160, and it can include other items 162. Code frequency detection logic 156 can generate a trigger to user interaction system 134, based upon how frequently one or more DTC codes have been generated by processing logic 148. For instance, the importance level of various DTC codes can be identified. In some cases, it may be that triggering system 152 triggers user interaction system 134 to run an issue-specific process flow based on a single occurrence of a given DTC code. In another example, or for other DTC codes, it may be that system 134 is not triggered until a given DTC code has been generated a threshold number of times, or a threshold number of times within a given time window.

Code pattern detection logic 158 determines whether user interaction system 134 is to be triggered based upon one or more patterns in the DTC codes that are generated by logic 148. For instance, it may be that a certain sequence (or other pattern) of DTC codes indicates that a given issue is present, for which system 134 should run an issue-specific process flow to help user 112 address the issue. The frequency thresholds and patterns used by logic 156 and logic 158 can be determined in a wide variety of ways. They can be determined using machine learning processes, they can be determined empirically, or they can be determined in a wide variety of other ways.

In one example, irritation level processing logic 160 illustratively receives an irritation level measure from user 112 through a user interface mechanism 110. The irritation level value acts as a sensitivity input for triggering system 152. For instance, if user 112 sets an irritation level value that is relatively high, this may indicate that triggering system 152 should, in general, trigger user interaction system 134 to begin running an issue-specific process flow 138 less often. On the other hand, if the irritation level value input by user 112 is relatively low, this may indicate that triggering system 152 should, in general, trigger user interaction system 134 more often. Thus, irritation level processing logic 160 receives the irritation level value and uses it as a global sensitivity value to indicate, in general, whether user 112 would like user interaction system 134 to run issue-specific processing flows more frequently when fewer issues or less severe issues are detected, or whether user 112 wishes system 134 to run the issue-specific processing flows less frequently, or for only more serious issues that are detected. In doing so, the logic that triggers system 134 can vary the DTC frequency thresholds, patterns, etc. that serve as the basis for deciding to trigger system 134, based on the irritation level value.

User interaction system 134, itself, illustratively includes issue identifier logic 164, process flow search and retrieval logic 166, process flow execution system 168, handoff system 170 and it can include other items 172. Process flow execution system 168 illustratively includes information gathering logic 174, interaction interface surfacing logic 176, interaction detection logic 178, and it can include other items 180. Handoff system 170 illustratively includes flow position identifier logic 182, position code input/output logic 184, and it can include other items 186.

Briefly, in operation, issue identifier logic 164 identifies a particular issue that needs to be addressed, based upon the triggering input received from triggering system 152. In one example, triggering system 152 can directly identify the issue that was detected, or it can provide information (such as DTC code frequency or pattern information, or a wide variety of other information), to issue identifier logic 164 which, itself, identifies the issue to be addressed. Process flow search and retrieval logic 166 illustratively searches data store 136 to identify a particular issue-specific process flow 138-140 that is to be run, based upon the detected issue. An example of a process flow is described in greater detail below with respect to FIGS. 2 and 5. In order to identify the issue-specific process flow, search and retrieval logic 166 can use an index 142. One example of an index is described below with respect to FIG. 3. Information gathering logic 174 then gathers any information that is known, and that is relevant to the particular issue-specific process flow that was returned by logic 166. For instance, the process flow may follow a flow diagram that asks for operator inputs or answers to questions or other information at various points. It may also be that the sensor data 120, or other data that is available on mobile machine 102, can be used to answer some of those questions, without the need for operator inputs.

Interaction interface surfacing logic 176 then begins surfacing user interfaces for user 112, according to the issue-specific process flow that was returned by logic 166. It generates the interfaces and indicates actions that user 112 can take, in order to address the detected issue. It may ask the user to perform an action and then indicate whether the issue was resolved. It may also ask the user to input other information. Thus, interaction detection logic 178 detects user interactions with the running process flow, when this occurs. Based on the user interactions, interaction surfacing logic 176 can continue surfacing user interfaces, according to the issue-specific process flow 138 that it is running.

In one example, the issue-specific process flows 138-140 are arranged so that the actions that can be performed by the user are grouped based on whether they can be performed from within the operator compartment or whether they are performed outside of the operator compartment. Within those groups, they can be further grouped based upon the complexity of the actions that need to be performed, and also based upon the operator convenience in performing those actions. In one example, the process flows are arranged so that the user is first asked to perform the actions that can be performed within the operator compartment. Those actions are arranged so that the user is first asked to perform the simpler actions. Simpler actions may be those that can be performed more quickly, with less operator involvement, or other actions. In addition, the actions can be arranged in the flow for operator convenience. Therefore, if the operator needs to disassemble some piece in order to perform an action, all actions that are performed on the disassembled piece are grouped together so that the operator does not reassemble the piece, only to come back to an action later in the process flow where the user needs to again disassemble the piece. Some examples of the actions in the process flow that are grouped are described in greater detail below.

When the process flow is indicating that the user is to perform an action within the operator compartment, then logic 176 illustratively controls a user interface mechanism 110 (either directly or by using user interface component 146) to display or otherwise surface a user interface on a device within the cab. This can be on a display that is integrated into the operator compartment or on a mobile device that is connected to the control system in the operator compartment, or in other ways. However, when the process flow indicates that the user is to perform an action outside the cab, then handoff component 170 illustratively hands off the issue-specific process flow to a mobile device 104 so that the operator can take the mobile device 104 with him or her, outside the operator compartment, and perform the actions, as instructed, without needing to reenter the operator compartment to see what actions are to be performed.

In doing so, flow position identifier logic 182 identifies the current position within the issue-specific process flow that is being executed by process flow execution system 168, and position code input/output logic 184 provides a position code to mobile device 104 to indicate which issue-specific process flow is being run, and the location within that issue-specific process flow where process flow execution system 168 is leaving off. In that way, the mobile device 104 can pick-up directly where the user left off inside the operator compartment, without needing the user to forward the process flow through a plurality of different screens or other user interfaces that the user has already seen.

Position code input/output logic 184 can do this in a number of different ways. For instance, it can output a code on a user interface mechanism 110 that user 112 can read. User 112 can then enter that code into mobile device 104 manually. In another example, logic 184 automatically communicates with mobile device 104 using communication system 106 (which may be a near field communication system, or another communication system). It can then provide the code automatically to mobile device 104 so that mobile device 104 can pick-up at the spot in the issue-specific process flow where the user left off inside the operator compartment.

Figure 2:
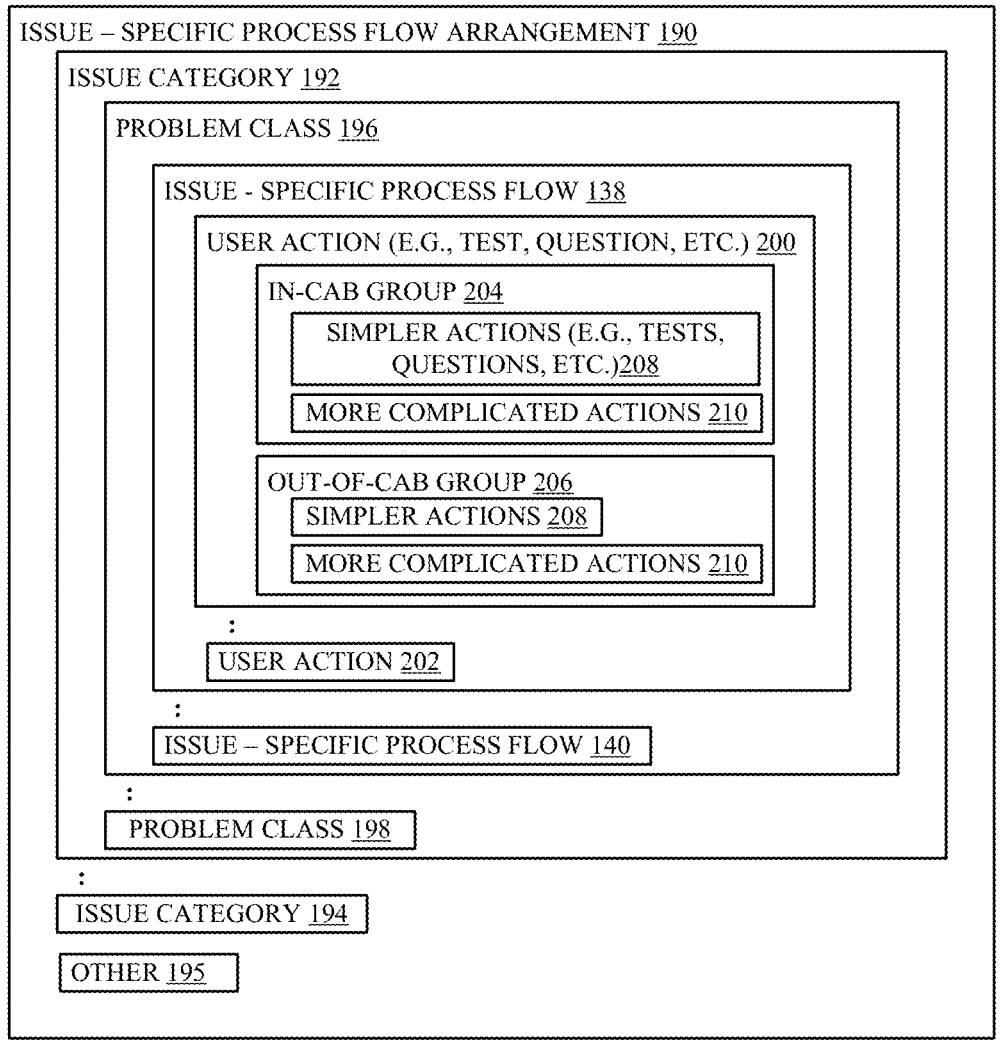
FIG. 2 is a block diagram of one example of the organization of an issue-specific process flow.

FIG. 2 is a block diagram illustrating one example of how an issue-specific process flow (in the example shown in FIG. 2 it is issue-specific process flow 138) is arranged. In one example, the issue-specific process flows are arranged according to an issue-specific process flow arrangement 190. The arrangement 190 shows that the issue-specific process flows 138-140 are first arranged according to a plurality of different issue categories 192-194. By way of example, the issue categories may correspond to issues that can arise in the controllable subsystems 130 in the mobile machine 102. As a specific example, a planter may have issue categories that correspond to seed population, seed singulation, seed spacing and downforce margin.

Next, the issue-specific process flows 138-140 are broken down by the class of problem that they address. Problem classes 196 and 198 are illustrated in FIG. 2. In one example, again for a planter, the main classes of problems may include problems on a single row unit, a vacuum section of the planter, or problems on the planter as a whole. Then, within each problem class, there are a set of issue-specific process flows 138-140 that can be run to address problems within that class. Each process flow has a set of user actions 200-202 that can be performed during the process flow. As briefly mentioned above, the user actions 200-202 are each broken into a group of in-cab actions 204 and out-of-cab actions 206. Each group of actions can then further be grouped by whether they are simpler actions 208 or more complicated actions 210. Each group of actions 208-210 is also illustratively grouped based on operator convenience, as discussed above.

Figure 3:
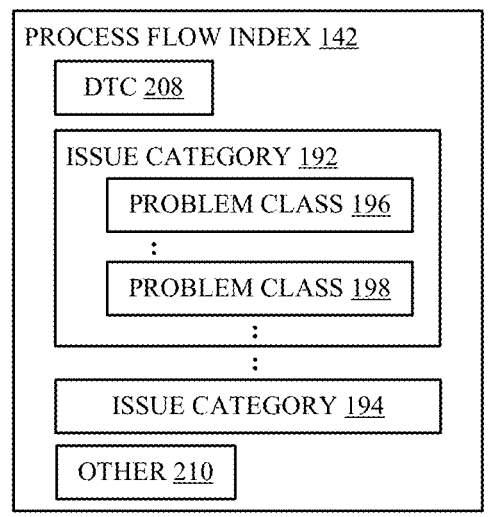
FIG. 3 is a block diagram of one example of a process flow index.

One example of index 142 is illustrated in FIG. 3. The issue-specific process flows can be indexed by diagnostic trouble code 208. They can also illustratively be indexed by issue categories 192-194 or by problem classes 196-198, or both. They can be indexed according to other index criteria 210, as well. Therefore, when process flow search/retrieval logic 166 searches data store 136 for an issue-specific process flow 138-140, it can access index 142 or otherwise search through the issue-specific process flows 138-140 by issue category and then by problem class within each of the issue categories. It can identify a given issue-specific process flow, within a problem class, based upon the issue detected, based upon the DTC codes that gave rise to that detection or in other ways.

When it retrieves the given issue-specific process flow 138, it generates user interfaces for the user beginning within the in-cab group 204 of user interfaces and then it proceeds to the out-of-cab group 206. Within each group, it generates user interface displays first for the simpler actions 208 (that are grouped based on user convenience) and then for the more complicated actions 210 (again grouped based on user convenience).

Figure 4:
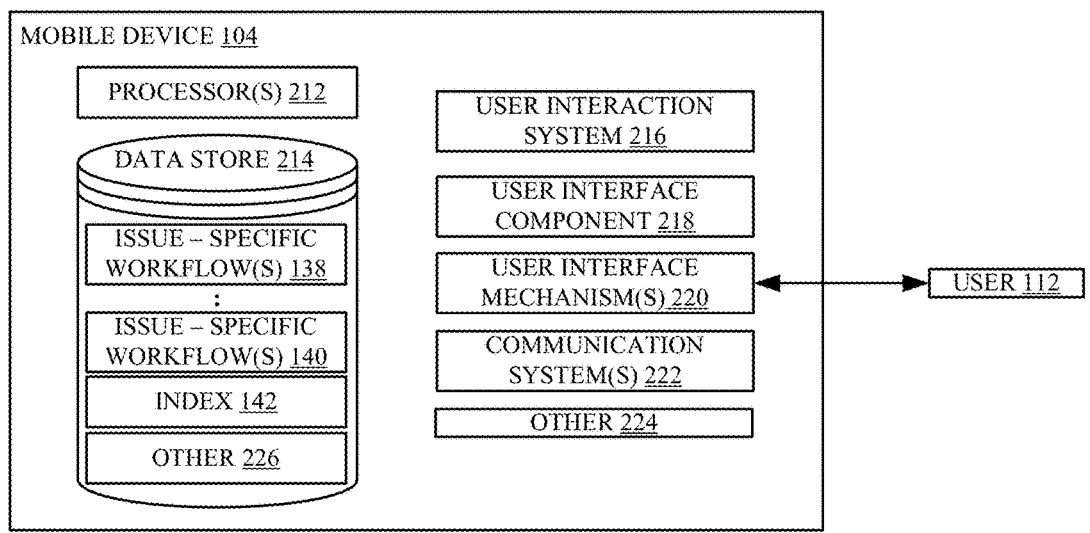
FIG. 4 is a block diagram of one example of a mobile device.

Before describing the operation of architecture 100 in more detail, a brief description of one example of a mobile device 104 will first be provided. FIG. 4 shows a block diagram of one example of mobile device 104, and illustrates that it can include one or more processors 212, data store 214, a user interaction system 216 (which can be similar to, or different from, user interaction system 134 shown in FIG. 1), user interface component 218, user interface mechanisms 220, one or more communication systems 222, and it can include other items 224. Data store 214 can include issue-specific process flows 138-140 (or versions of those process flows modified to run on a mobile device 104), index 142, and it can include other items 226. User interaction system 216 illustratively receives the flow position code output by logic 184 on mobile machine 102, and accesses the corresponding issue-specific process flow 138-140 from data store 114, and begins running it at the point where system 134 (in machine 102) left off. It can use user interface component 218 to generate user interfaces on user interface mechanisms 220 (such as on a screen, using an audible device, etc.).

Figure 5:
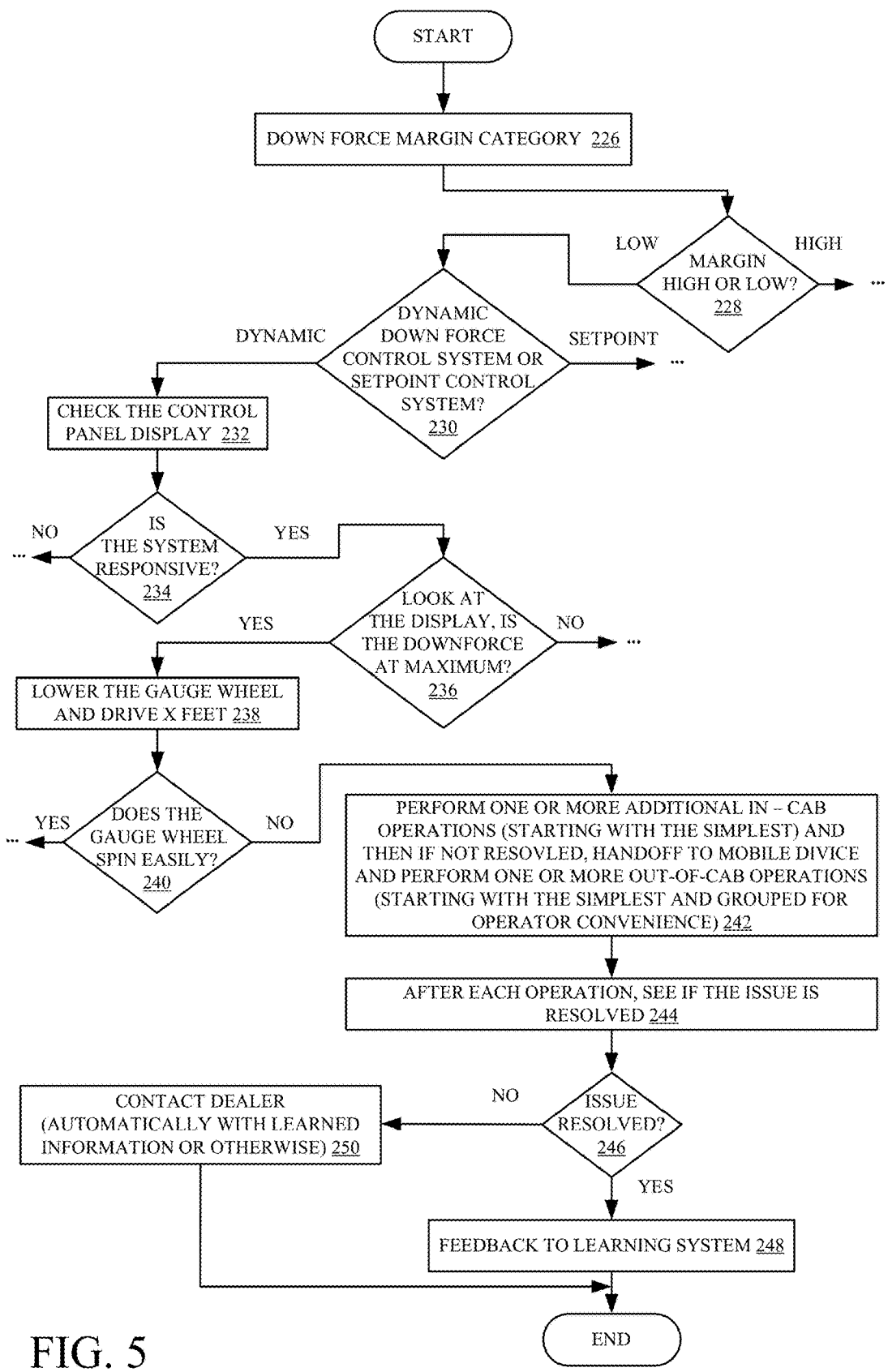
FIG. 5 shows a flow diagram illustrating one example of a portion of an issue-specific process flow.

FIG. 5 illustrates a flow diagram that shows one example of a portion of an issue-specific process flow 138-140. In the example shown in FIG. 5, the issue-specific process flow identifies an issue related to downforce margin, in an example in which mobile machine 102 is a planter. The process flow shown in FIG. 5 first identifies that the issue is in the downforce margin category 226 and starts by determining whether the downforce margin is high or low. This is indicated by block 228. In doing so, it can first determine whether it can answer the question, itself, based upon information available to it from sensor data 120 or other sources on mobile machine 102. If so, it answers the question itself, and proceeds to the next block of the flow diagram. If not, however, it illustratively generates a user interface display asking the user this question, and allows the user to provide an input indicating its answer.

It then determines whether the downforce on the planter is being exerted by a dynamic downforce control system or a set point control system. This is indicated by block 230. Again, it may be able to determine this based upon machine configuration settings, or other machine configuration information that is available to it in mobile machine 102. If not, however, it illustratively generates a user interface display asking the user to indicate which type of system is being used.

FIG. 5 assumes that it is a dynamic downforce control system. The issue-specific process flow then generates a user interface instructing the user to check the control panel display to determine whether it indicates that the system is currently responsive and active. This is indicated by blocks 232 and 234. For instance, it may display a textual message instructing the user to check a particular icon or display element on a control panel display to determine this. FIG. 5 assumes that the dynamic downforce control system is responsive.

The issue-specific process flow then again asks the user to check a display element to determine whether the downforce being applied is at approximately its maximum value. This is indicated by block 236. FIG. 5 assumes that it is. The process flow then generates a user interface that instructs the user to lower the gauge wheel and drive a certain number of feet forward. This is indicated by block 238. It then asks the user to check to determine whether the gauge wheels spin easily during that operation, as indicated by block 240. FIG. 5 assumes that the gauge wheels do not spin easily.

The issue-specific process flow then generates user interfaces instructing the user to perform one or more additional in-cab operations (starting with the simplest) and then, if the issue is still not resolved, it hands the process flow off to mobile device 104 and asks the user to perform one or more out-of-cab operations (again starting with the simplest). All of the operations are illustratively grouped for operator convenience, as described above. Performing these operations is indicated by block 242 in FIG. 5.

After each operation, the process flow checks to determine whether the issue is resolved. This is indicated by block 244. For instance, it may generate a user interface display, with one or more user input mechanisms that can be actuated by the user. Actuation of one of the input mechanisms may indicate that the issue is resolved, while actuation of another user input mechanism may indicate that it is not. This is just one example of how the process flow can determine whether the issue is resolved.

If the issue is resolved, then the particular action that the operator performed to resolve the issue may be logged or output for other reasons. For instance, it may be provided to a remote system that performs machine learning to refine the issue-specific process flow. It may do this to move the action upward in the process flow so that the issue may be resolved more quickly next time it arises. This is just one example of what can be done when the issue is resolved, and this is indicated by blocks 246 and 248 in FIG. 5.

If the issue is not resolved, after all actions in the issue-specific process flow have been performed, then the issue-specific process flow may indicate that another person is to be contacted, such as a dealer, a maintenance person, etc. The process flow can do this automatically (such as by sending an electronic communication to a dealer, maintenance person, etc.) or it can instruct the user to do this manually, or it can automatically generate a message and allow the user to manually indicate that a message should be sent. All of these are indicated by block 250 in FIG. 5.

Figure 6A:
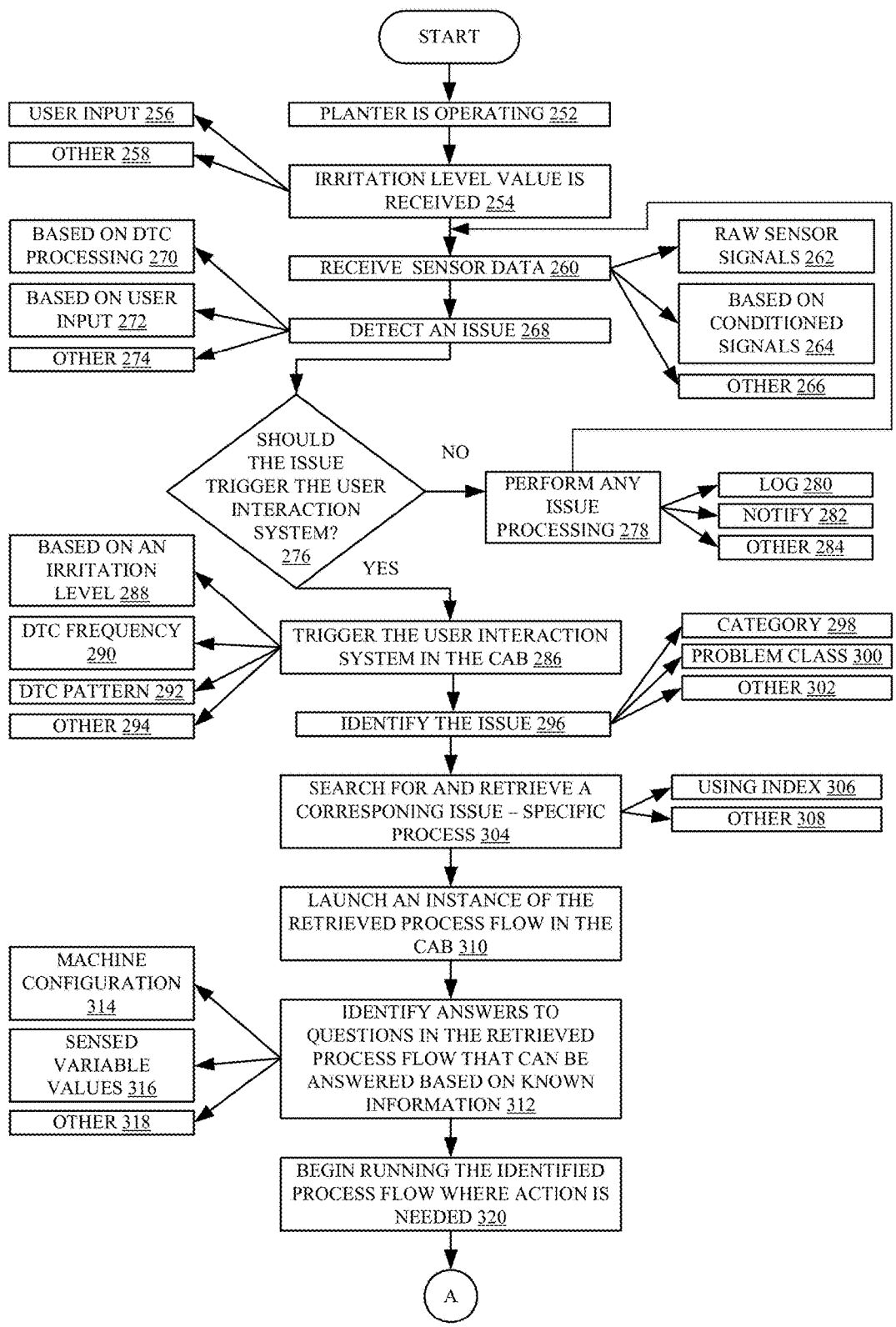
FIGS. 6A and 6B (collectively referred to herein as FIG. 6) illustrate one example of a flow diagram indicating the operation of the architecture shown in FIG. 1.
Figure 6B:
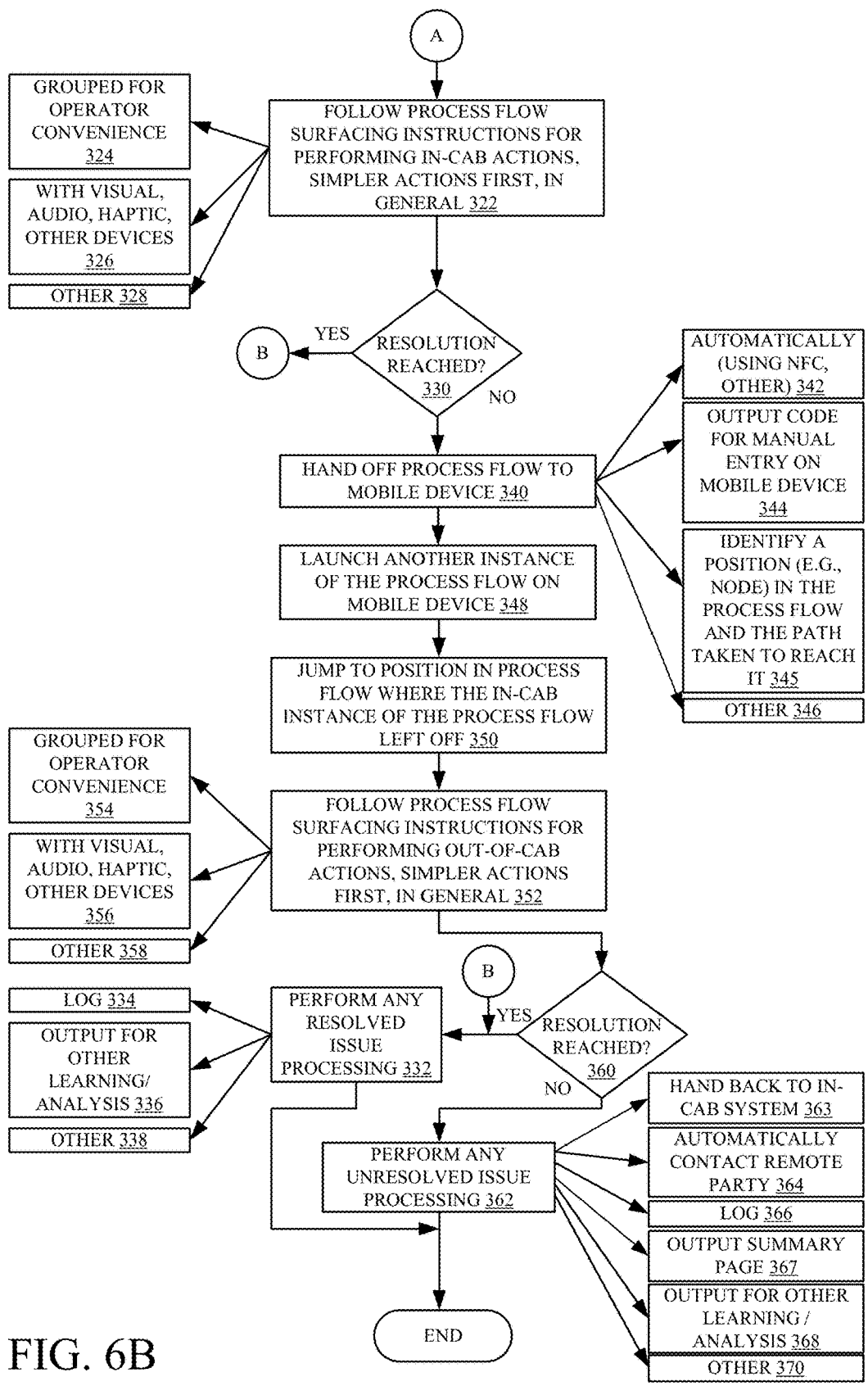

FIGS. 6A and 6B (collectively referred to as FIG. 6) illustrate a flow diagram that shows one example of the operation of architecture 100 (shown in FIG. 1) in detecting an issue, triggering user interaction system 134, and then executing an issue-specific process flow (such as the one described above with respect to FIG. 5), based upon the detected issue. It is first assumed that mobile machine 102 is a planter, and that it is operating. This is indicated by block 252 in FIG. 6. In one example, at some point during the operation of the planter, or prior to that, irritation level processing logic 160 illustratively generates a user interface that allows user 112 to provide an irritation level value to set the sensitivity of triggering system 152. This is indicated by block 254 in FIG. 6. Again, this can be performed using a user input 256, or using a pre-defined or other irritation level value that may be previously set or otherwise input. This is indicated by block 258.

Issue detection system 132 receives sensor data 120 indicative of the sensed variables. This is indicated by block 260. The sensor data can be raw sensor signals 262. It can be data based on conditioned signals as indicated by block 264. It can be data that is aggregated, calculated, or otherwise processed, and this is indicated by block 266.

At some point, either based on the sensor data 120 or based on a user input, issue detection system 132 detects an issue. This is indicated by block 268. The issue may be detected by DTC processing logic 148, as indicated by block 270. It may be detected based on a user input, as indicated by block 272. It can of course be detected in other ways as well, as indicated by block 274.

Triggering system 152 then determines whether it should trigger user interaction system 134 to begin executing an issue-specific process flow, based upon the detected issue. This is indicated by block 276. Again, this can be based on a frequency of DTC codes detected by logic 156, it can be based on a code pattern detected by logic 158, or it can be done in other ways as well. All of these determinations can also take into account the irritation level set using logic 160.

If triggering system 152 determines that user interaction system 134 is not to be triggered, then it can perform any issue processing which may be desired other than triggering system 134. This is indicated by block 278. For instance, it may log the issue as indicated by block 280. It may notify or alert the operator in other ways, as indicated by block 282, or it can perform other processing 284.

If, at block 276, it is determined that user interaction system 134 should be triggered, then triggering system 152 triggers user interaction system 134 to locate and begin running an issue-specific process flow. This is indicated by block 286 in FIG. 5. Again, this can be done based on an irritation level 288, based on a DTC frequency 290, based on a DTC pattern 292, or for other reasons 294. Also, it can provide information to user interaction system 134 when the system is triggered. This information can include the particular DTC, the frequency of DTCs, the DTC pattern, or other reasons for which system 134 was triggered. It can include other information as well.

Once triggered, issue identifier logic 164 identifies the particular issue that was detected, and for which a process flow is to be run. This is indicated by block 296. It can identify the issue based on the information that was passed in by triggering system 152. That information may include, for instance, an issue category 298, an issue problem class 300, it my outright identify the issue, or it may provide other information indicative of the issue, as indicated by block 302.

Once the issue has been identified, process flow search and retrieval logic 166 searches for, and retrieves, a corresponding issue-specific process flow. This is indicated by block 304. Logic 166 may use index 142. This is indicated by block 306. It may identify the particular flow 138-140 by scanning all of the flows, by performing other types of matching, or in other ways. This is indicated by block 308.

Logic 166 returns the issue-specific process flow to process flow execution system 168 which then launches an instance of the retrieved process flow, in the cab or operator compartment of mobile machine 102. This is indicated by block 310.

Once the flow is launched, information gathering logic 174 parses the flow to identify which questions need to be answered within the process flow. It then identifies any answers to those questions that it can, based upon information that is already known to it. This is indicated by block 312. For instance, it may access a set of stored configuration data that indicates a machine configuration of machine 102. This is indicated by block 314. It may be able to answer some of the questions based upon sensor data 120 (or other data available to it). This is indicated by block 316. It may be able to automatically answer some of the questions in other ways as well, and this is indicated by block 318.

At some point in the process flow, user action will be needed. Thus, execution system 168 begins running the process flow, and surfacing user interfaces where user action is needed. This is indicated by block 320.

When user action is needed, process flow execution system 168 follows the process flow, surfacing instructions for the user to perform in-cab actions. In one example, the simpler actions are performed first. This is indicated by block 322. Determining which actions are simpler may be done when the process flow is authored, or it may be done dynamically, based upon the machine configuration, operating conditions, sensor values, etc. In general, however, actions that will require less operator or user involvement are illustratively deemed to be simpler, and they are performed first, so that, if they address the issue, the issue will be addressed with a relatively small amount of user involvement.

It will also be noted that, in one example, the actions are grouped for operator convenience. This is indicated by block 324. This was discussed above.

It will also be noted that the user interfaces can surface the instructions in a variety of different ways. They can be visual user interface displays generated on a display device. They can also be audio instructions or other audio sounds indicating an action that an operator should take next. Similarly, they can be surfaced using haptic devices that provide an indication to the user of an action to be performed. These and other devices are indicated by block 326 in FIG. 6. The instructions for performing in-cab actions can be surfaced in other ways as well, and this is indicated by block 328.

If a resolution is reached, while performing any of the in-cab actions, processing proceeds to block 332 where any resolved issue processing is performed. This type of processing can take a wide variety of different forms. For instance, the resolution can be logged as indicated by block 334. The logged information can be used in later analysis, or other types of operations. In addition, the particular resolution that resolved the issue can be output for machine learning or other analysis operations as indicated by block 336. Other resolved issue processing can be performed as well, and this is indicated by block 338.

If, at block 330, it is determined that the issue has not yet been resolved, the handoff system 170 hands off the process flow to mobile device 104, so that the user can continue to perform actions outside of the cab (or operator's compartment). This is indicated by block 340 in FIG. 6. As briefly discussed above, the handoff can be performed automatically (such as using a near field communication system, or in other ways). This is indicated by block 342. In another example, flow position identifier logic 182 identifies a position, within the issue-specific process flow, where process flow execution system 168 left off and position code input/output logic 184 outputs a code indicative of that position. The code can then be displayed to user 112, who manually enters it into mobile device 104. This type of manual entry is indicated by block 344 in FIG. 6. The handoff can be performed in other ways as well, and this is indicated by block 346.

In another example, the position code input/output logic 184 not only generates the code to indicate the position in the process flow where execution system 168 left off, but also the path, through the process flow, that system 168 took to get there. This is indicated by block 345. As an example, the process flow may be represented by a directed graph of connected nodes, where there are multiple paths to a node. The code may be updated to indicate the node and the paths as described below with respect to FIGS. 6C-6E.

Once mobile device 104 has the information needed to identify the particular issue-specific process flow that was being run in the cab of machine 102, and the location where that process flow left off in the cab, then user interaction system 216 in mobile device 104 launches another instance of that issue-specific process flow on the mobile device. This is indicated by block 348 in FIG. 6. It then jumps to the position in the process flow where the in-cab instance of the process flow left off. This is indicated by block 350. By way of example, the code manually entered into mobile device 104 may be a page identifier (or index identifier) that identifies a particular page or location within the process flow where the processing left off, on the in-cab instance. In another example, the hand off system in mobile machine 102 may automatically communicate this information to the mobile device 104.

Once system 216 navigates to that location, user interaction system 216 begins to follow the process flow, surfacing instructions for performing out-of-cab actions. Again, the instructions for performing those actions may provide instructions for performing simpler actions first, in general. This is indicated by block 352.

The actions may also be grouped for operator convenience, as discussed above. This is indicated by block 354. They may be surfaced on mobile device 102 with a visual display, with an audio or haptic interface, or with other devices. This is indicated by block 356. They may be surfaced in other ways as well, as indicated by block 358.

At any point in the process flow, if a resolution has been reached, or when the last action in the process flow has been performed, it is determined whether the actions performed, as instructed by the process flow, have resulted in a resolution to the issue. This is indicated by block 360 in FIG. 6. If a resolution has been reached, the processing proceeds to block 332 where any resolved issue processing is performed. If no resolution has been reached, then any unresolved issue processing can be performed, as indicated by block 362. For instance, user interaction system 216 can hand the process flow back to the in-cab system 134 by sending or otherwise outputting a code that identifies the position (and possibly the path taken to get there) for input into position code input/output logic 184 in system 134. This is indicated by block 363. System 216 can use one or more communication systems 222 on the mobile device to automatically contact a remote party, such as a dealer, a maintenance person, etc. This is indicated by block 364. It may be that user interaction system 134 uses communication system 106 on mobile machine 102 in order to automatically contact a third party.

In another example, the unresolved issue processing can include logging the issue and an indication that the particular process flow that just completed did not address the issue. Logging is indicated by block 366.

Either system 134 or system 216 can output a summary page showing the path that was taken through the process flow, which nodes were contacted, steps taken, etc. This is indicated by block 367.

Information indicative of the execution of the process flow, and the issue detected, and a result of executing the process flow can also be output for other analysis or learning, such as by external or remote systems or devices 108. This is indicated by block 368 in the flow diagram of FIG. 6. By way of example, the information may be output for analysis to determine why the process flow did not resolve the issue. It may be output to machine learning components for analysis or it may be output for storage and analysis by other systems.

Unresolved issue processing can take a wide variety of other forms as well. This is indicated by block 370.

Figure 6C:
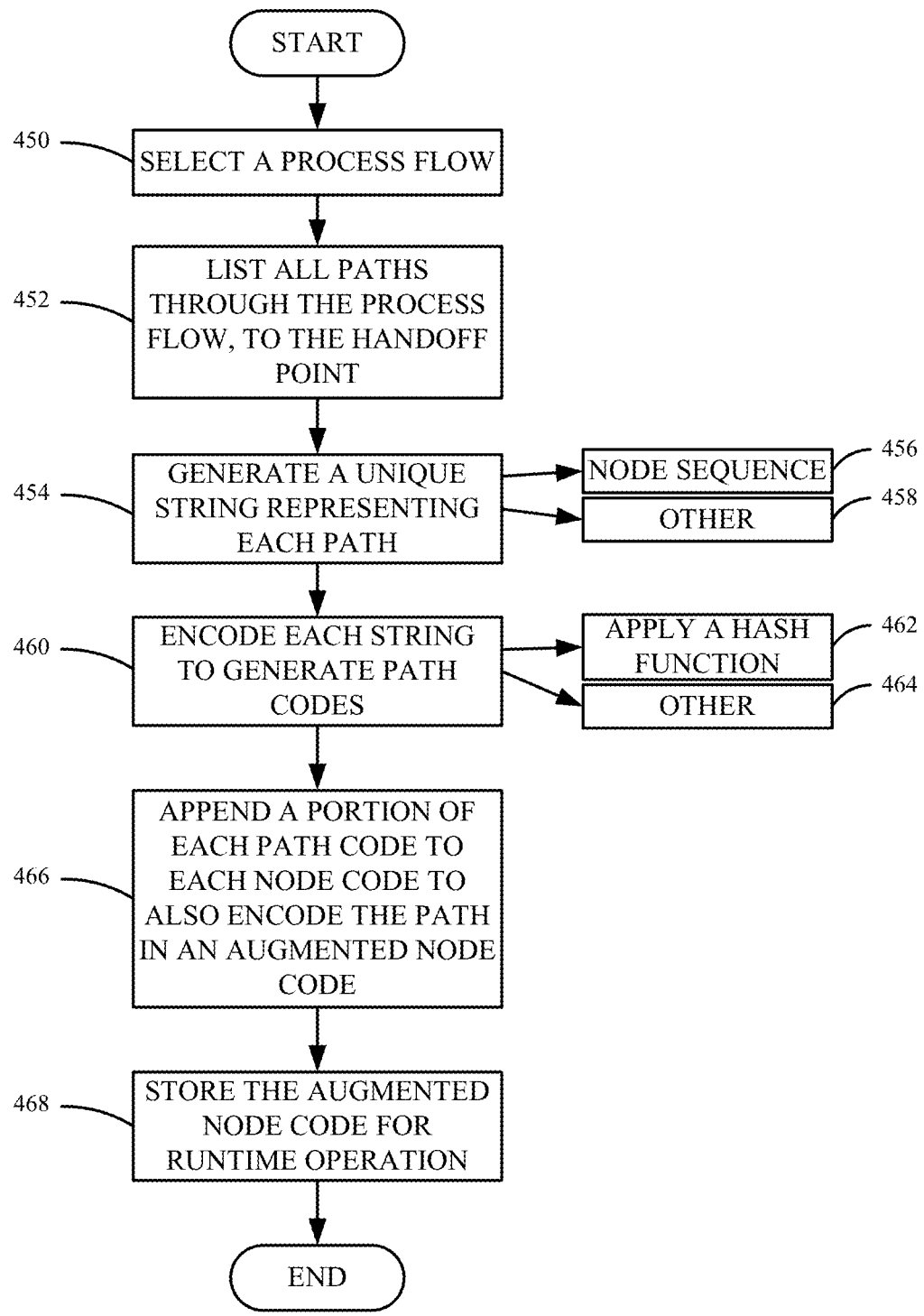
FIG. 6C is a flow diagram showing the generation of an augmented node code.

FIG. 6C is a flow diagram illustrating one example of the operation of how position code input/output logic 184 (or another code generator) can generate the augmented node codes discussed above with respect to FIG. 6. It will be appreciated that the augmented node codes can be computed on-the-fly, as the user interaction systems 134 and/or 216 are processing a process flow, or they can be pre-computed. The present discussion will proceed with respect to an example in which they are pre-computed and stored for use during runtime.

A process flow is first selected for code generation. This is indicated by block 450. Then, all paths through the process flow, to the point at which the process flow will be handed off (either handed off from system 134 to system 216, or vice versa) are identified and listed. This is indicated by block 452.

Figure 6D:
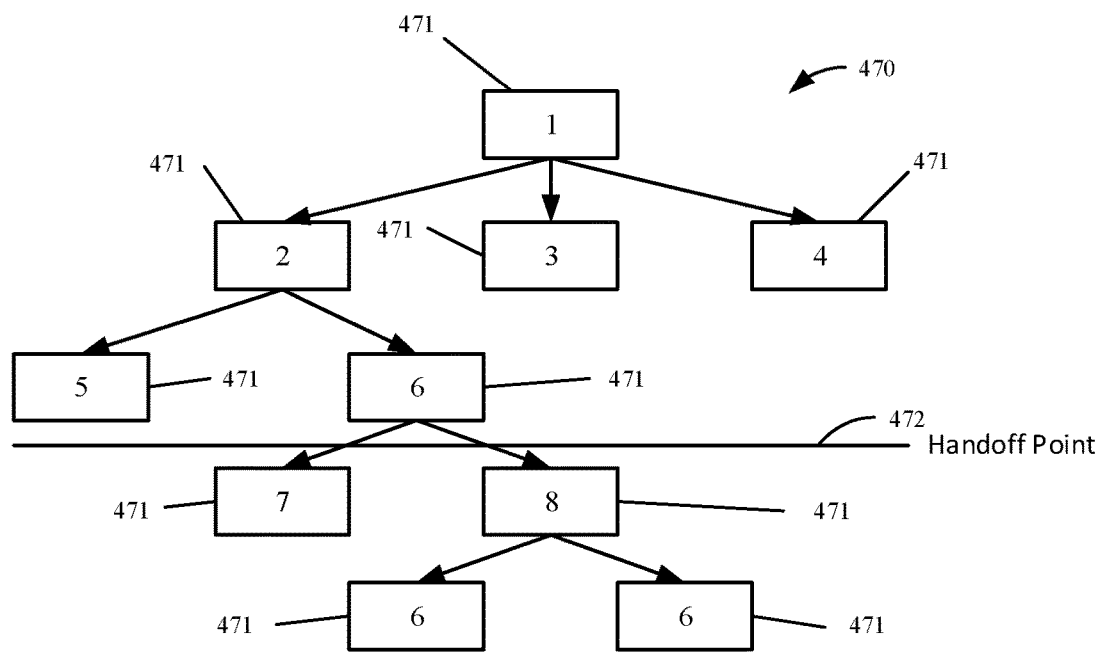
FIGS. 6D and 6E show simplified examples of process flow directed graphs.
Figure 6D:
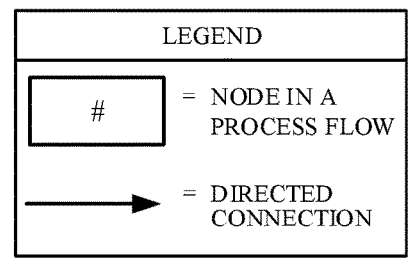
Figure 6E:
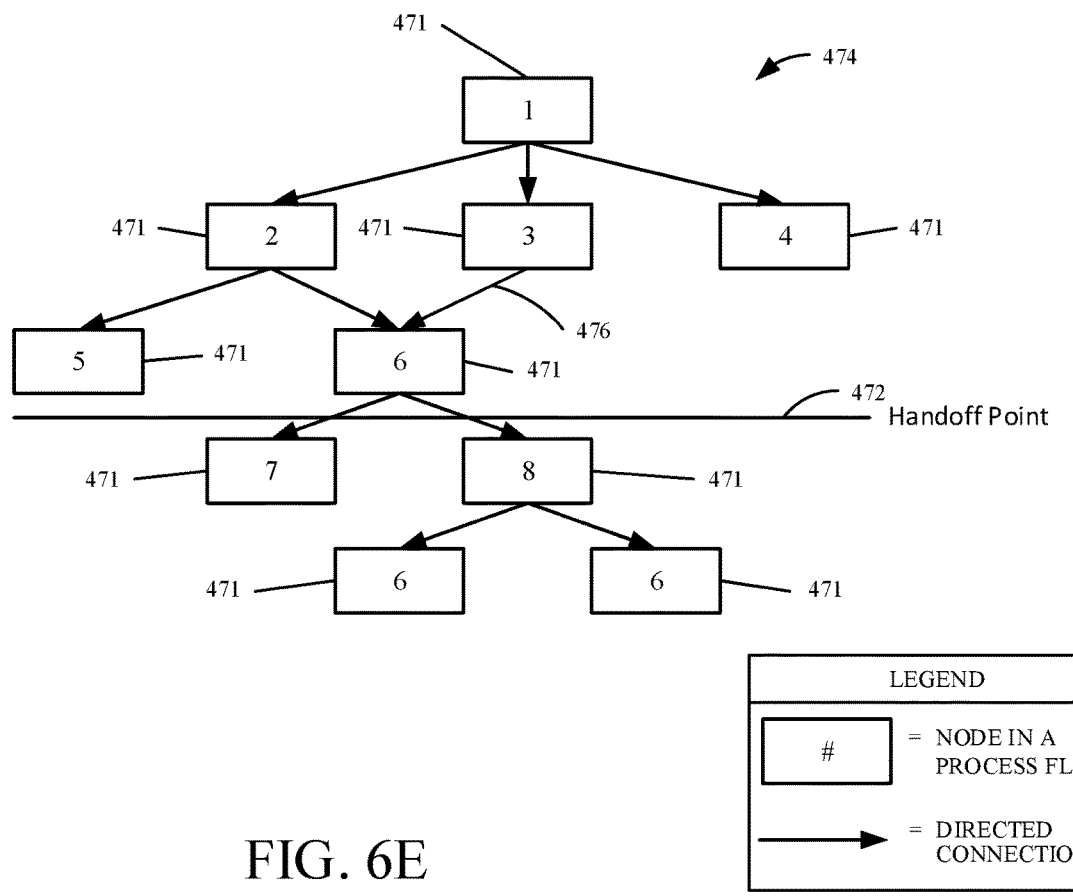

A unique string is then generated for each listed path. This is indicated by block 454. FIGS. 6D and 6E illustrate this in more detail.

FIG. 6D is a process flow directed graph structure 470. Structure 470 has nodes 471 that are identified by node identifiers 1-10, each representing a node in a corresponding process flow. Nodes 471 are hierarchically connected by directed connections, represented in FIG. 6D by the arrows connecting nodes 471. Line 472 represents the handoff point at which the in-cab system 134 will hand the process flow off to system 216 on the mobile device.

Structure 470 represents a simple structure in that there is only one way to get to each of nodes 471. Therefore, for instance, when system 134 leaves off on node 6, the out-of-cab device (or mobile device) will be told to begin at destination node 8. Also, there is only one path that system 134 could have taken to get to node 6 (that is, through nodes 1 and 2). Therefore, when the system wants to know the entire path through structure 470, it only needs to know the ending node (or leaf node), and that will define the path used to get there.

FIG. 6E, on the other hand, is a more complex process flow direct graph structure 474. Structure 474 is similar to structure 470 in FIG. 6D and similar items are similarly numbered. Structure 474 is more complex, because it now includes connection 476, which connects node 3 to node 6. Therefore, there are now two paths that the system can take to get to destination node 8. In order to know which path was taken, the system now needs to have a way to identify the particular path taken (e.g., that the path to node 8 was either through node sequence 1, 2, 6, 8 or through node sequence 1, 3, 6, 8.) Referring again to the flow diagram of FIG. 6C, the system thus computes augmented node codes by first listing all paths through the process flow (e.g., the flow corresponding to structure 474) to the handoff point 472. In the example of FIG. 4E, they are 1, 2, 6, 8 and 1, 3, 6, 8, as indicated by block 452 in FIG. 6C. It then generates the string representing each node sequence, as indicated by block 454. In one example, the string is the node path (e.g., strings "1268" and "1368"), as indicated by block 456, but it could be other string representations as well, as indicated by block 458.

Each string is then encoded to generate a path code. This is indicated by block 460. In one example, a hashing function is applied to each string to obtain the path code. This is indicated by block 462. Other encoding can be used as well, as indicated by block 464. Where a hash function is used, it can be, for example, an MD5 hash function or other functions. An MD5 hash of the two strings would yield unique path codes for each (such as a first path code of "56739803" for the first string and a second path code of "234509823" for the second string).

Then, a unique portion of each path code is appended to the simple node identifier that identifies the destination node. This is indicated by block 466. So, if the first path were taken to get to destination node 8, then the augmented node code would be "8567", where the "8" is the destination node identifier that identifies the destination node (which is the starting node after the handoff), and the "567" comes from the first 3 digits of the path code. The augmented node code for the second path would be "8234" for the same reasons. The receiving system (in this case user interaction system 216) can then identify the path by performing the code generation process in reverse order.

The augmented node code is then stored for runtime operation. This is indicated by block 468. The augmented node code can be retrieved by the handoff logic in either system 134 or system 216, or by any other part of the systems, as needed.

Figure 7A:
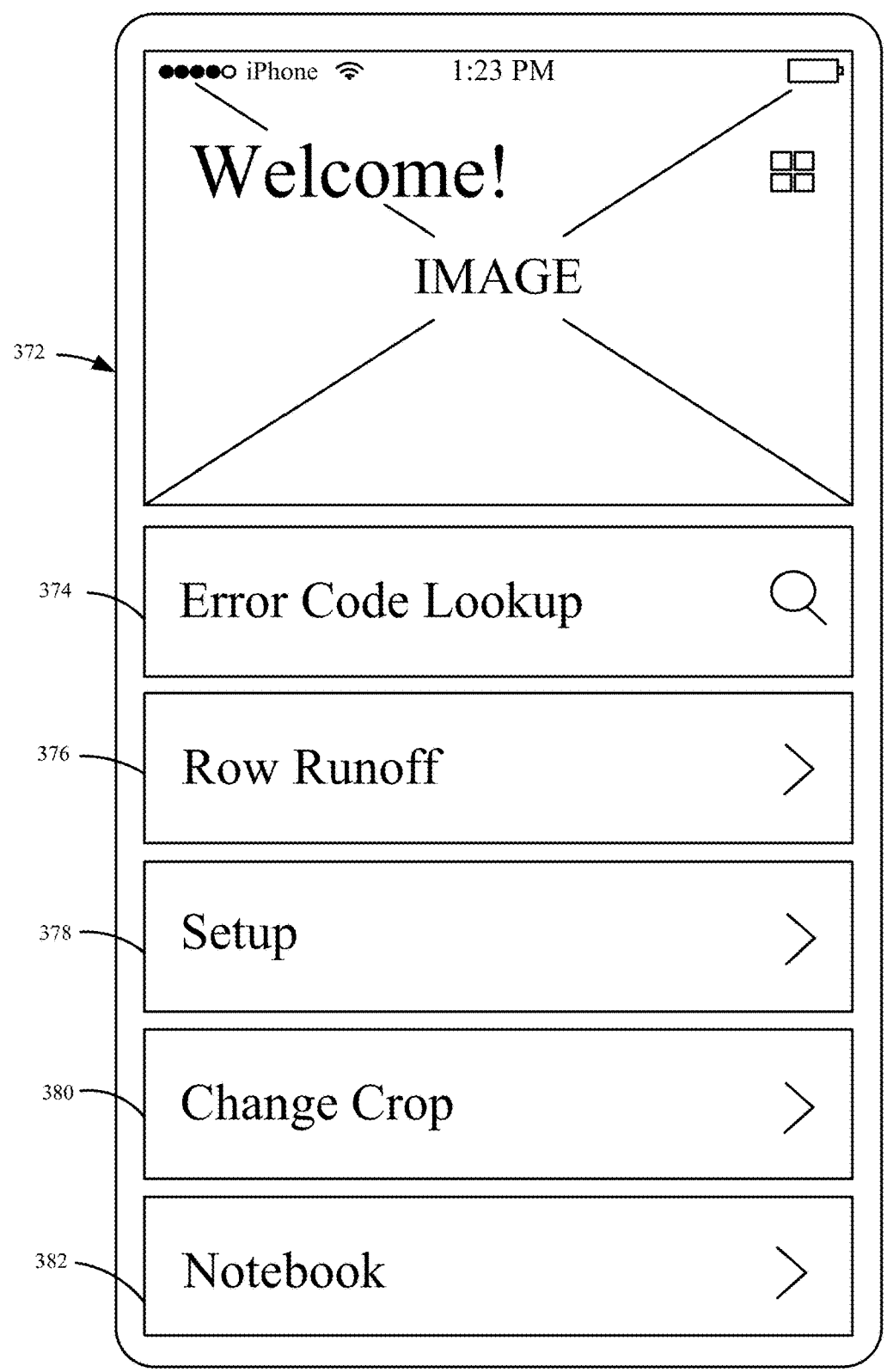
FIGS. 7A-7K show examples of user interface displays that can be generated on a mobile device.
Figure 7B:
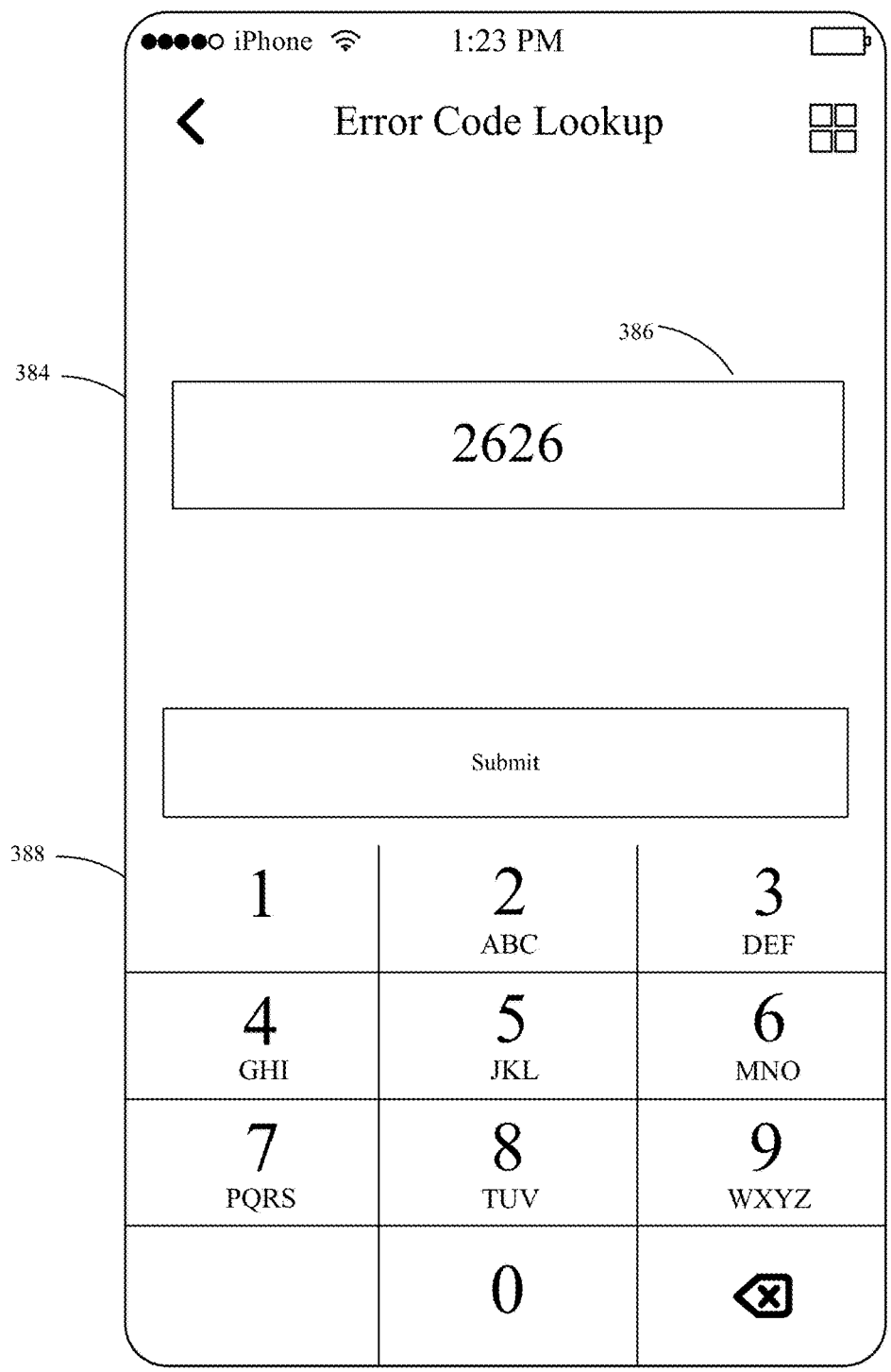

FIGS. 7A-7K show examples of user interface displays that illustrate how one example of handoff system 170 can be used to handoff the issue-specific process flow being run by process flow execution system 168 in mobile machine 102, to mobile device 104. FIG. 7A shows one example of a user interface display 372. Display 372 may include a variety of user input mechanisms, which can be links, buttons, etc. For instance, display elements 374, 376, 378, 380, and 382 may all be user actuatable input elements. Where the mobile device 104 includes a touch-sensitive display, the user can actuate any of elements 374-382 using an appropriate touch gesture, such as a touch or tap, a double tap, etc.

In the example shown in FIGS. 7A-7K, it is assumed that position code input/output logic 184 on mobile machine 102 has output a position code for user 112, on an appropriate user interface. For instance, it may display the position code, read it audibly to user 112, or otherwise output it. In that case, user 112 illustratively actuates error code lookup display element 374. Mobile device 104 then, in response, illustratively generates a user interface display, such as display 384 illustrated in FIG. 7B.

Display 384 illustratively includes text box 386 and keypad 388 that allow the user to enter an error code (that was displayed by position code input/output logic 184) into mobile device 104. In the example illustrated, the code is "2626", and it indicates a location within the issue-specific process flow where process flow execution system 168 left off.

User interaction system 216 then launches an instance of the corresponding issue-specific process flow on mobile device 104, and skips to the location indicated by code "2626". In one example, it may be the first action that the operator is instructed to perform, outside of the operating compartment of mobile machine 102.

Figure 7C:
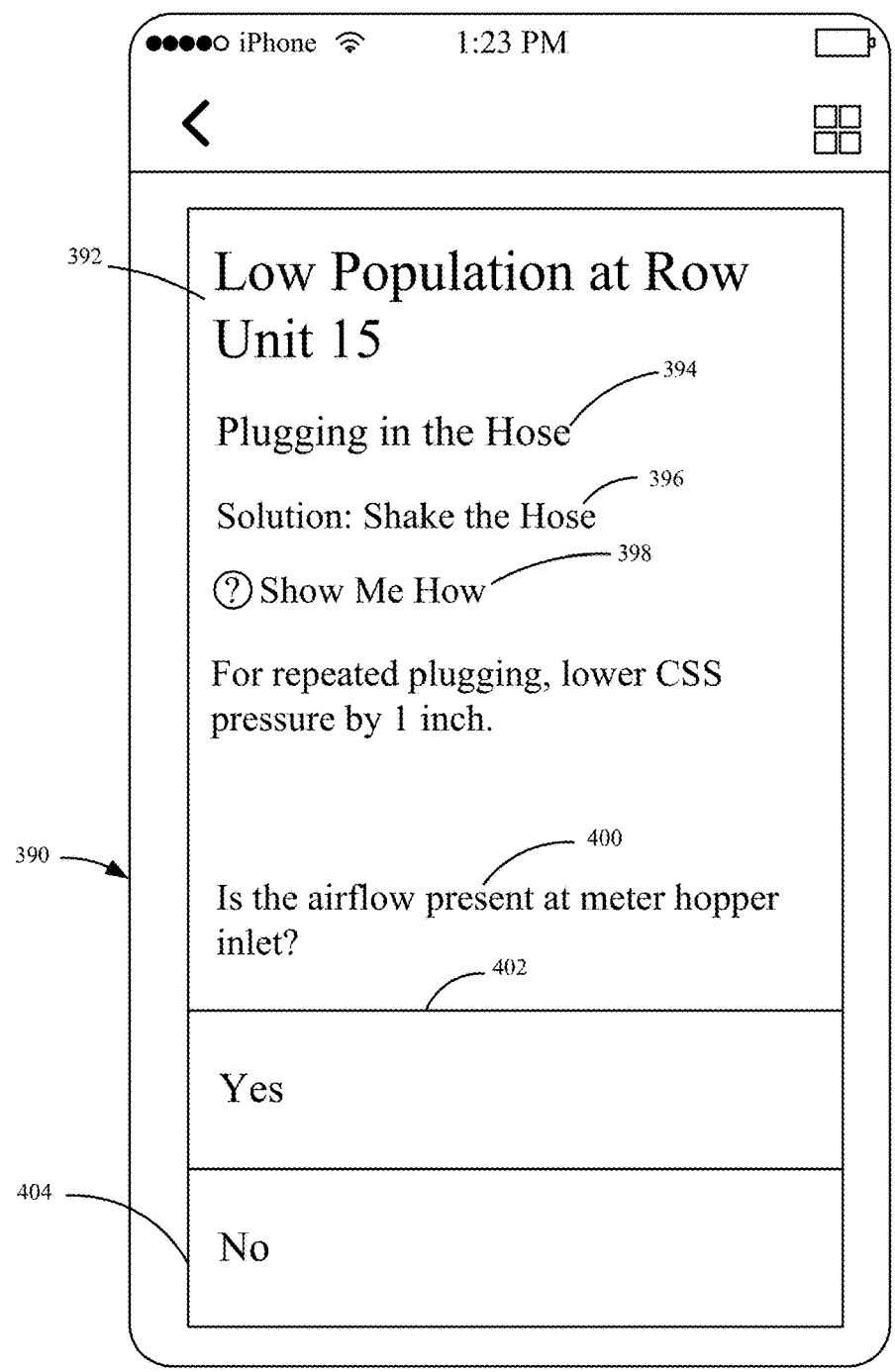

FIG. 7C shows one example of a user interface display 390 that indicates this. Display 390 includes an issue identifier 392 that identifies the particular issue that the user is attempting to address. It includes a diagnosis portion 394 that identifies a potential diagnosis of the problem, and a solution description 396 that describes a potential solution. It includes a tutorial actuator 398 which, when actuated by the user, navigates the user to a tutorial that explains how to perform the action described at 396. It also illustratively includes a step result portion 400 that allows the user to enter the result of the action that was just performed. For instance, the potential diagnosis is "Plugging in the Hose". A potential solution is to "Shake the Hose". After this action is performed, then the user is prompted to indicate whether airflow is present at the meter hopper inlet. A set of actuators 402 and 404 allow the user to quickly respond in the affirmative, or in the negative, respectively.

Figure 7D:
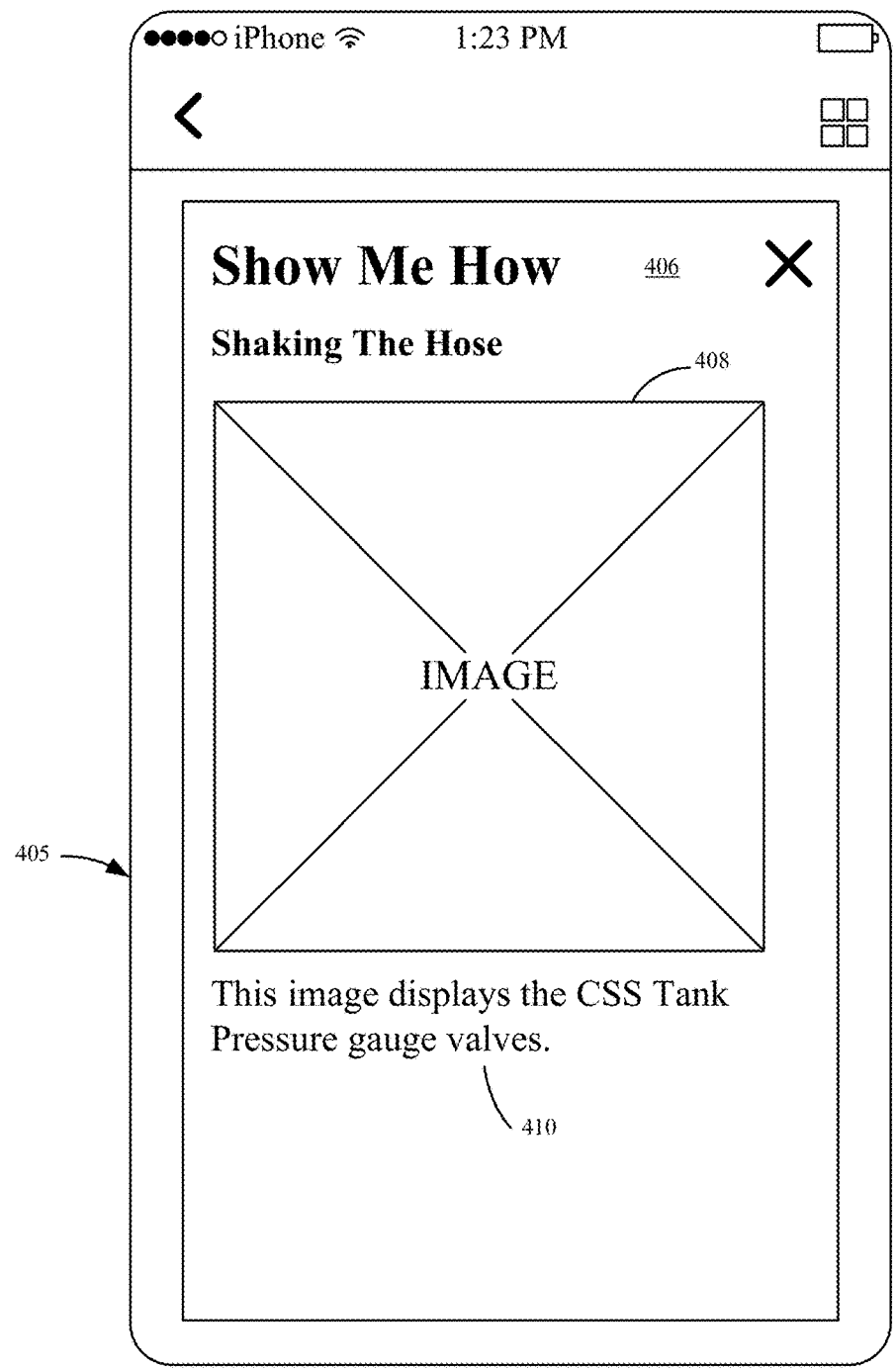

FIG. 7D shows one example of a user interface display 405 that can be generated when the user actuates the tutorial actuator 398. The tutorial display 406 illustratively includes an image section 408 that shows a graphic illustration of how to perform the action. It may also include a descriptive portion 410 that describes various items that are being displayed.

Figure 7E:
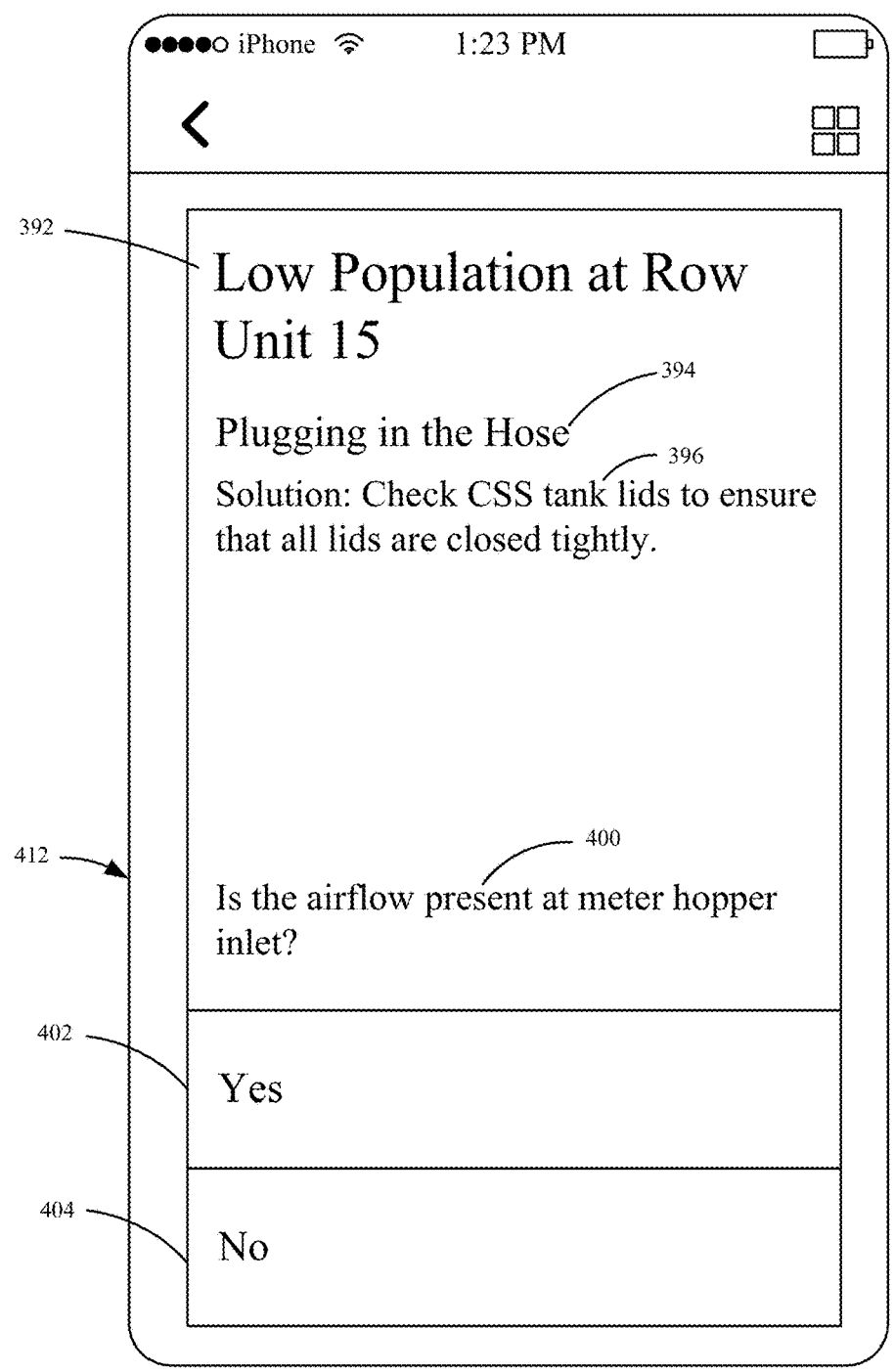

If the action does not address the issue, and the user actuates the "no" actuator 402 in FIG. 7C, then user interaction system 216 in mobile device 104 can progress to a next action in the issue-specific process flow. FIG. 7E shows one example of a user interface display 412 that indicates this.

Figure 7F:
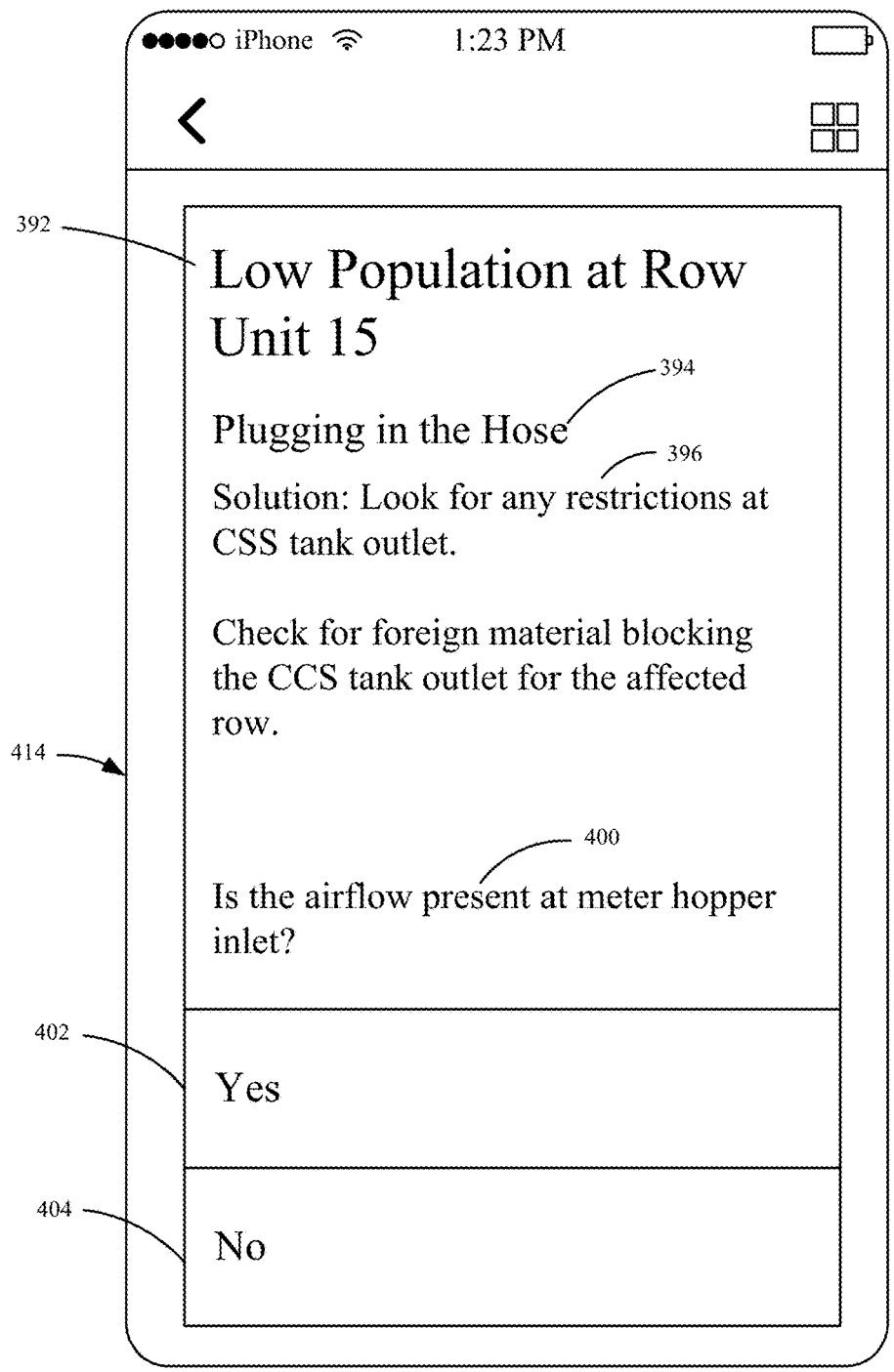
Figure 7G:
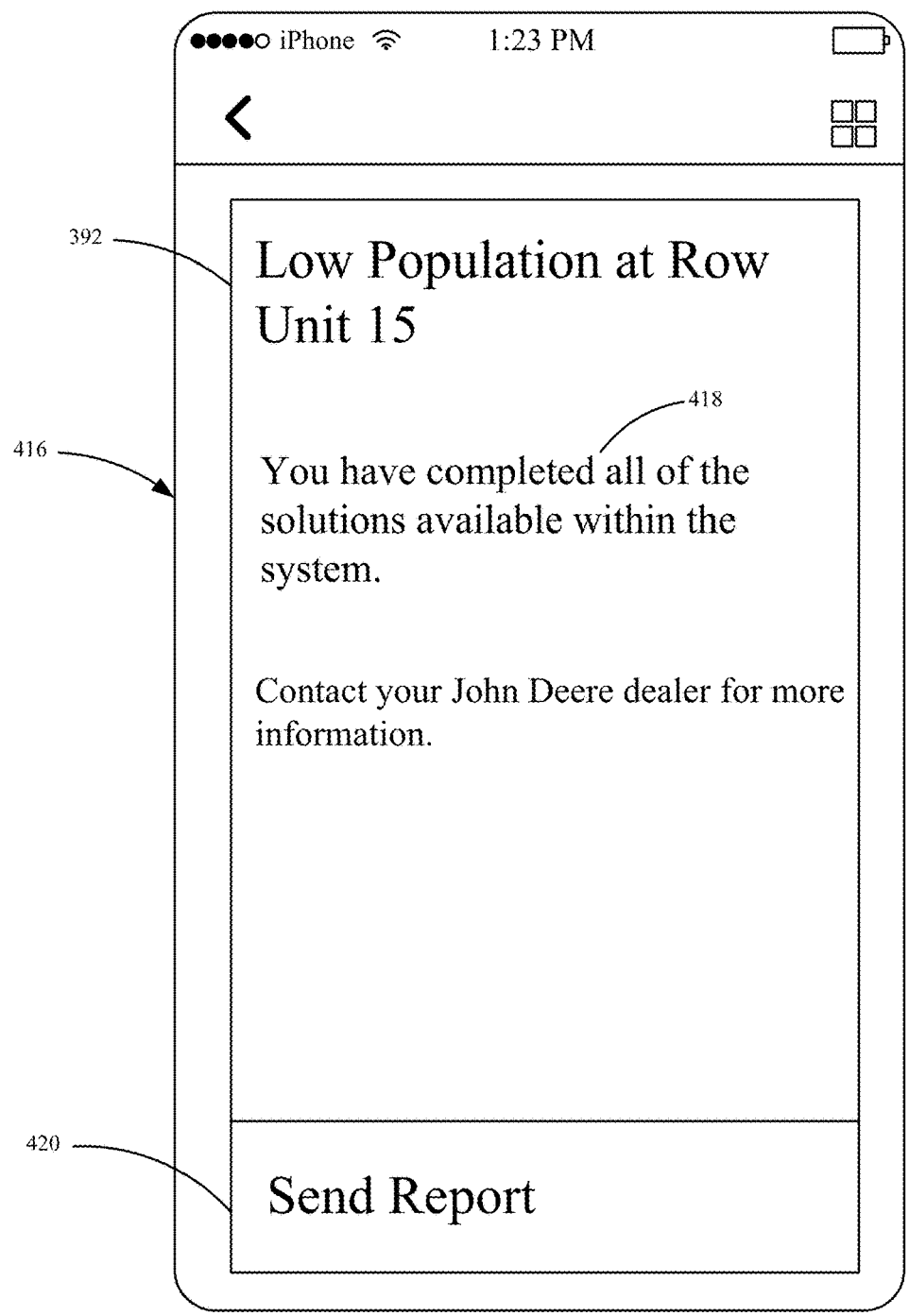
Figure 7H:
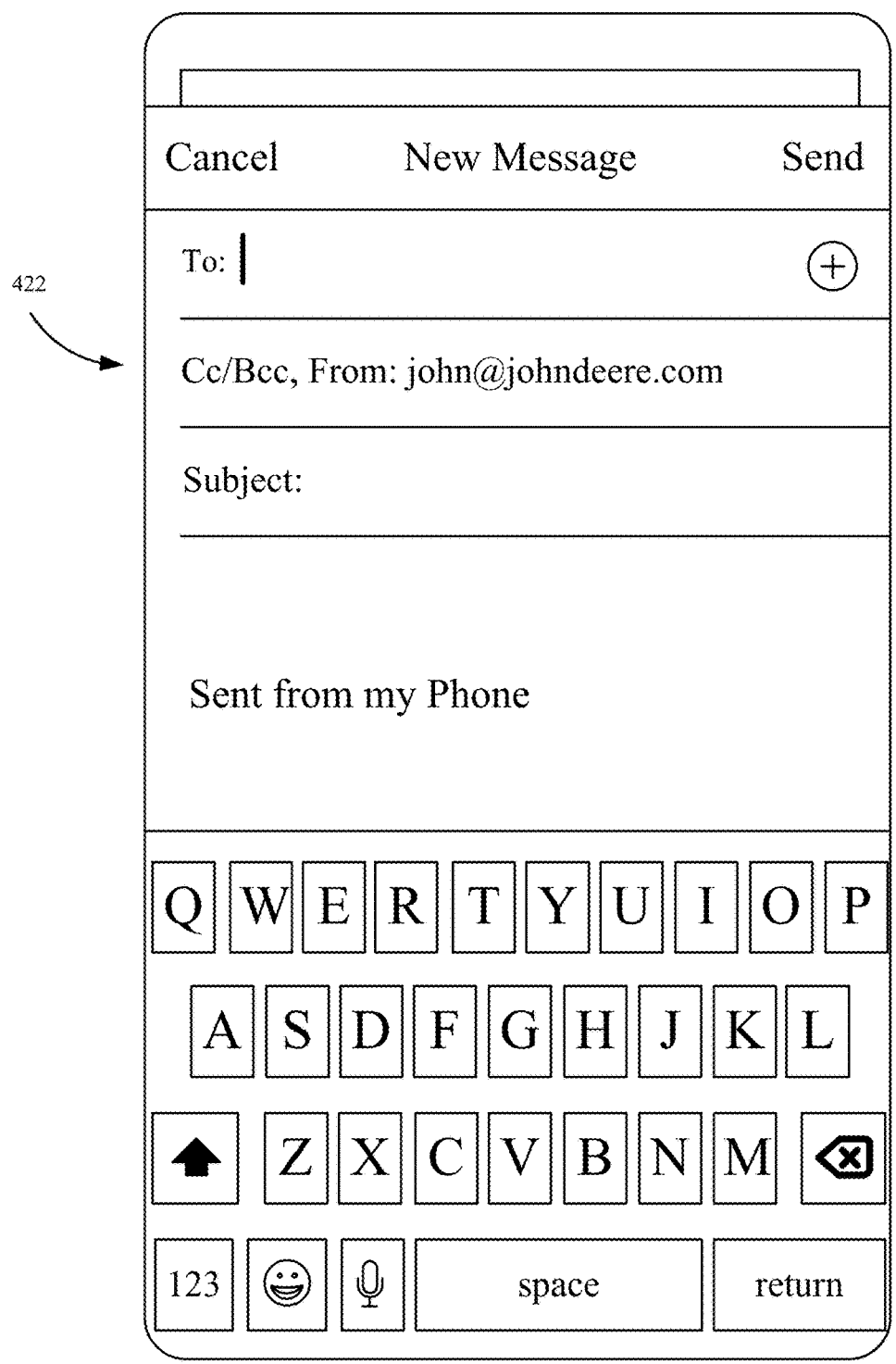

Some of the items are similar to those shown in FIG. 7C, and they are similarly numbered. It will be noted that the potential solution asks the user to perform a different action. In this case, it is to "Check CSS tank lids to ensure that all lids are closed tightly." Again, the user is asked to indicate whether this addressed the issue, at 400. If not, user interaction system 216 can progress to yet another action, as indicated by user interface display 414 in FIG. 7F. Again, some of the items in FIG. 7F are similar to those shown in FIG. 7C, and they are similarly numbered.

This process continues (with new interfaces being generated for subsequent actions, allowing the user to perform the action and indicate whether it addressed the issue) until either no further actions are available in the issue-specific process flow or until the issue has been resolved. If no further actions are available, and the issue has still not been resolved, then user interaction system 216 can generate a user interface display, such as display 416 shown in FIG. 7G that allows the user to notify another party (such as a dealer). User interface display 416 illustratively includes a descriptive portion 418 that indicates to the user that there are no other actions for the user to perform, in this process flow. It also indicates that the user may contact a third party. Further, it can include a user input mechanism, such as mechanism 420, that allows the user to initiate the process of sending a report to a third party. When the user actuates this, the mobile device can generate another user interface display, such as display 422 shown in FIG. 7H. Display 422 shows that the device has surfaced (or displayed) an e-mail template that is partially filled out so the user can quickly and easily send a report to a dealer, a technician, a repair person, etc.

In one example, when the user sends a report, electronic message, etc., to a third person, the user interaction system 216 automatically includes information indicative of the various actions that the user has performed in attempting to resolve the issue. That way, the third party will already have a great deal of information about what has been tried with respect to the issue that the operator is dealing with. This can help in a variety of different ways. For instance, a dealer may need to order parts for the operator, and this can be done quickly so that the operator can improve the operation of the mobile machine quickly as well. In another example, a technician or maintenance person may need to perform maintenance or repairs on mobile machine 102. Therefore, the technician or maintenance person may illustratively be able to have the proper parts that will be needed to perform the repair, because they have seen the information about what the issue is, and about what has already been tried to address the issue.

Figure 7I:
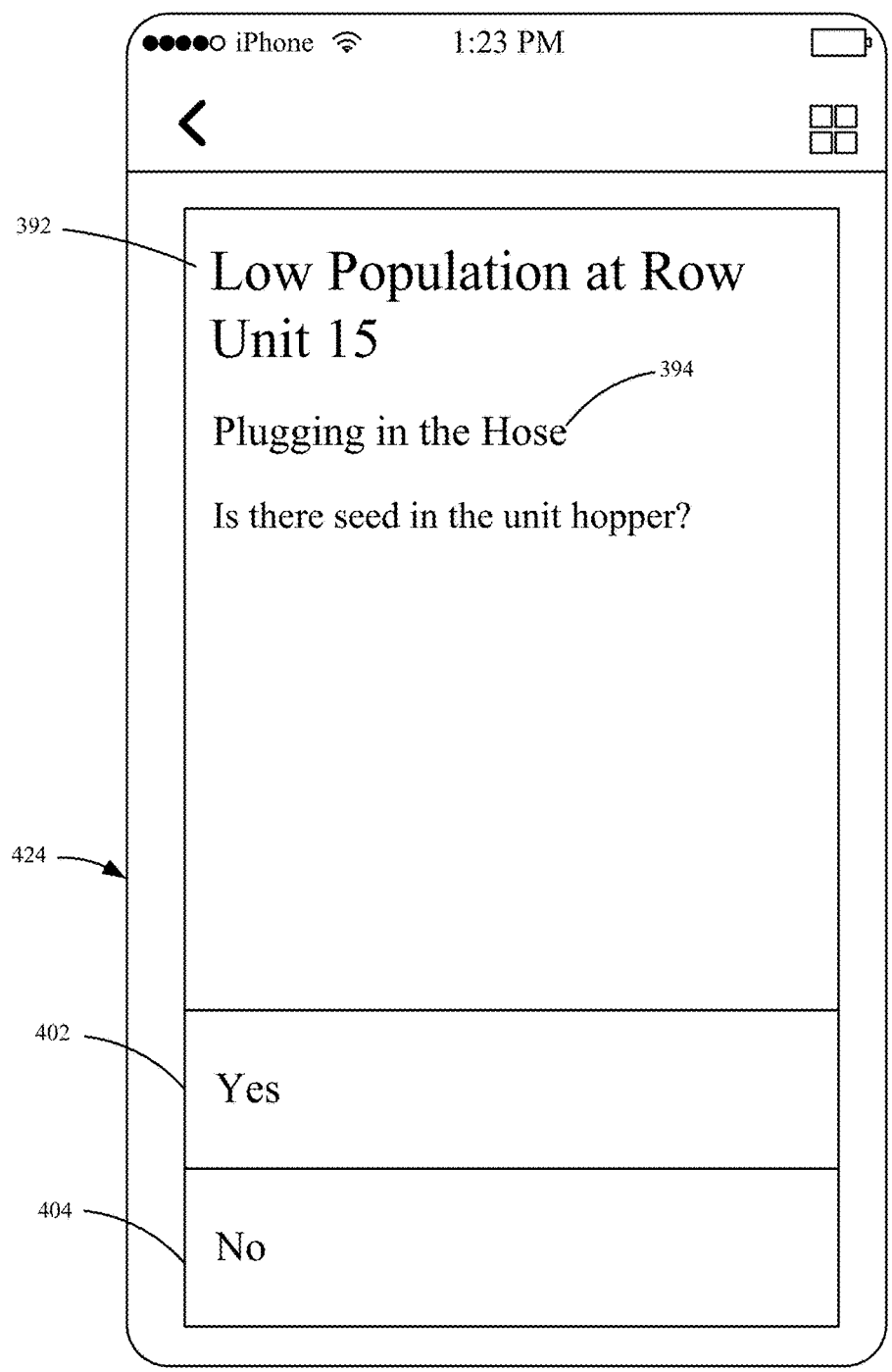
Figure 7J:
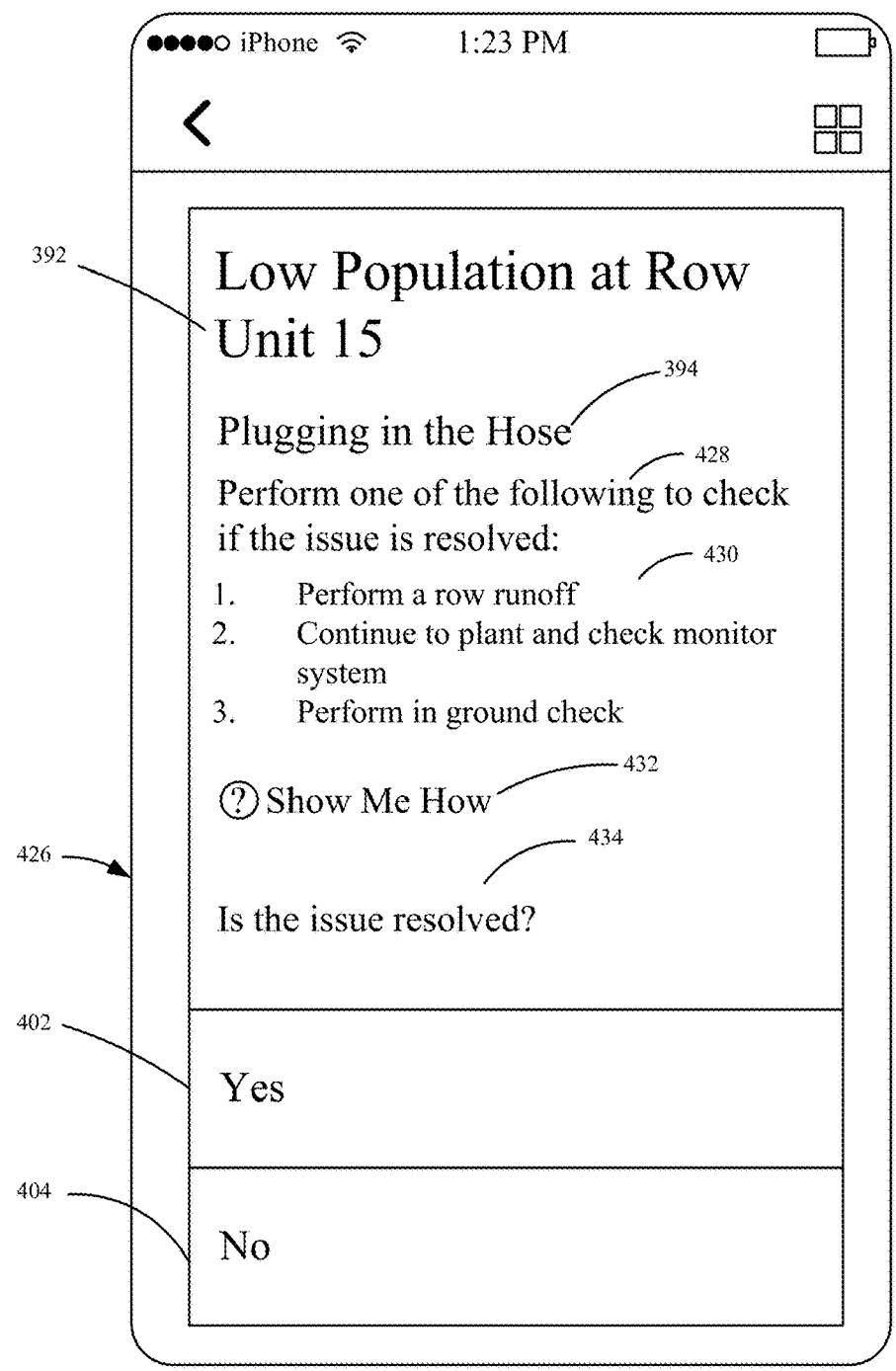

FIGS. 7I and 7J show user interface displays that may be generated in instances where the user may have difficulty determining whether the issue has been addressed. In that case, the issue-specific process flow being executed by user interaction system 216 may include instructions that instruct the user to perform certain operations, not only to address the issue, but also to make an accurate determination as to whether the issue has been resolved. In the example shown in FIG. 7I, user interface display 424 asks the user whether a machine condition exists so that the user can determine whether the problem has been resolved. In this case, it asks the user whether there is seed in the unit hopper. If so, then the issue-specific process flow may instruct the user to perform a sequence of steps to determine whether the problem is resolved.

For instance, FIG. 7J shows one example of a user interface display 426 that does this. Display 426 includes an instruction section 428 that instructs the user to perform three steps shown generally at 430 to determine whether the issue is resolved. It will be noted that, again, one of the steps includes a tutorial actuator 432 that can be actuated to view a tutorial of how to perform the step. Then, at 434, the display asks the user to indicate whether the issue is resolved. The user can actuate either of actuators 402 or 404 to indicate this.

Figure 7K:
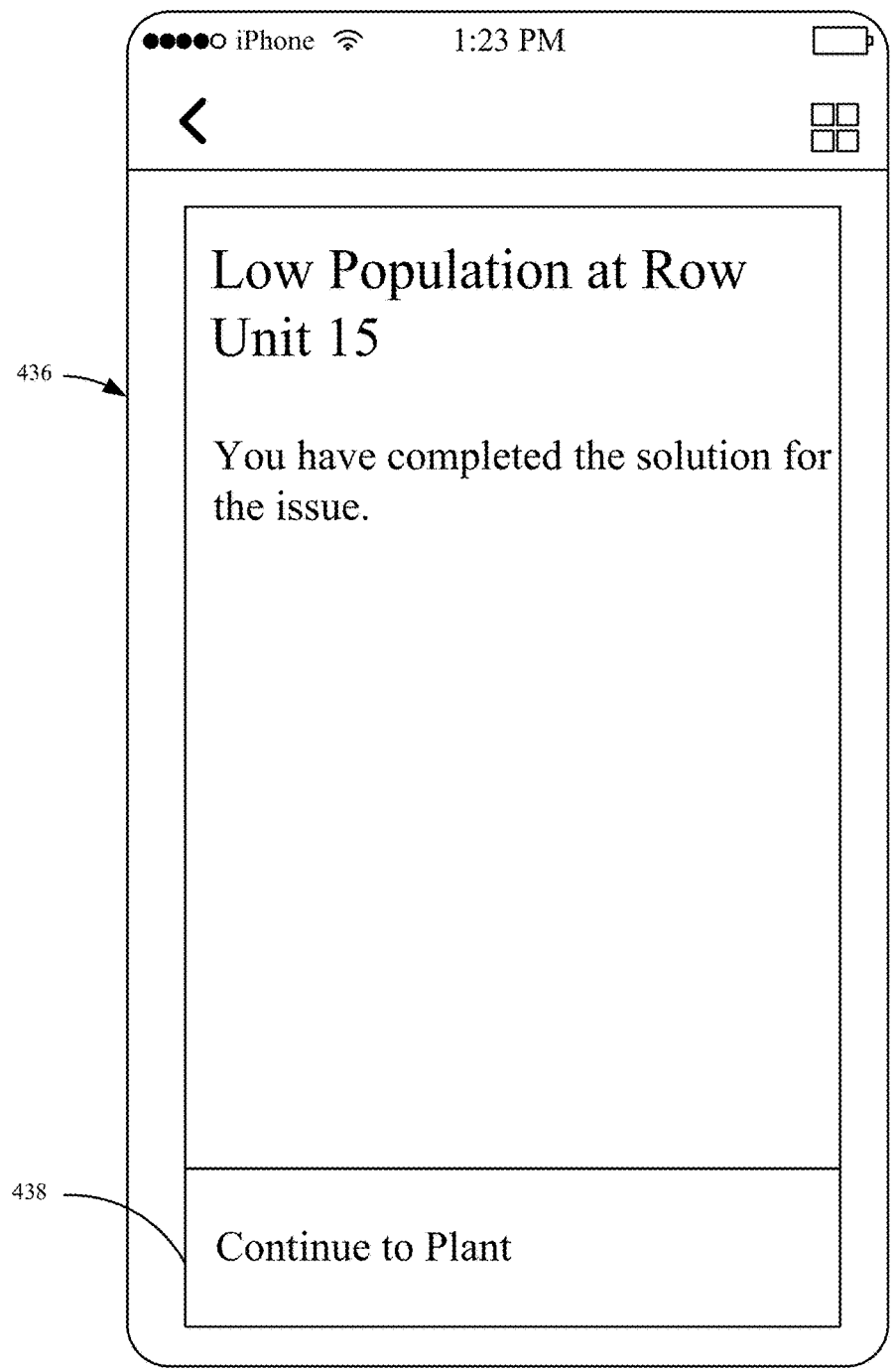

If the solution has been addressed, then user interaction system 216 can generate a user interface display, such as user interface display 436 shown in FIG. 7K. The user can be provided with a user input mechanism, such as actuator 438, that can be actuated to end the instance of the issue-specific process flow that is being run on mobile device 104. In response, mobile device 104 can also communicate with user interaction system 134 in mobile machine 102 to indicate that the instance of the issue-specific process flow that was running on mobile machine 102 can be ended as well.

It will be noted that the above discussion has described a variety of different systems, components and/or logic. It will be appreciated that such systems, components and/or logic can be comprised of hardware circuitry or other hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server or other computing component, as described below. The systems, components and/or logic can also be comprised of software logic elements of different combinations of hardware, software, firmware, etc., some examples of which are described below. These are only examples of the different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
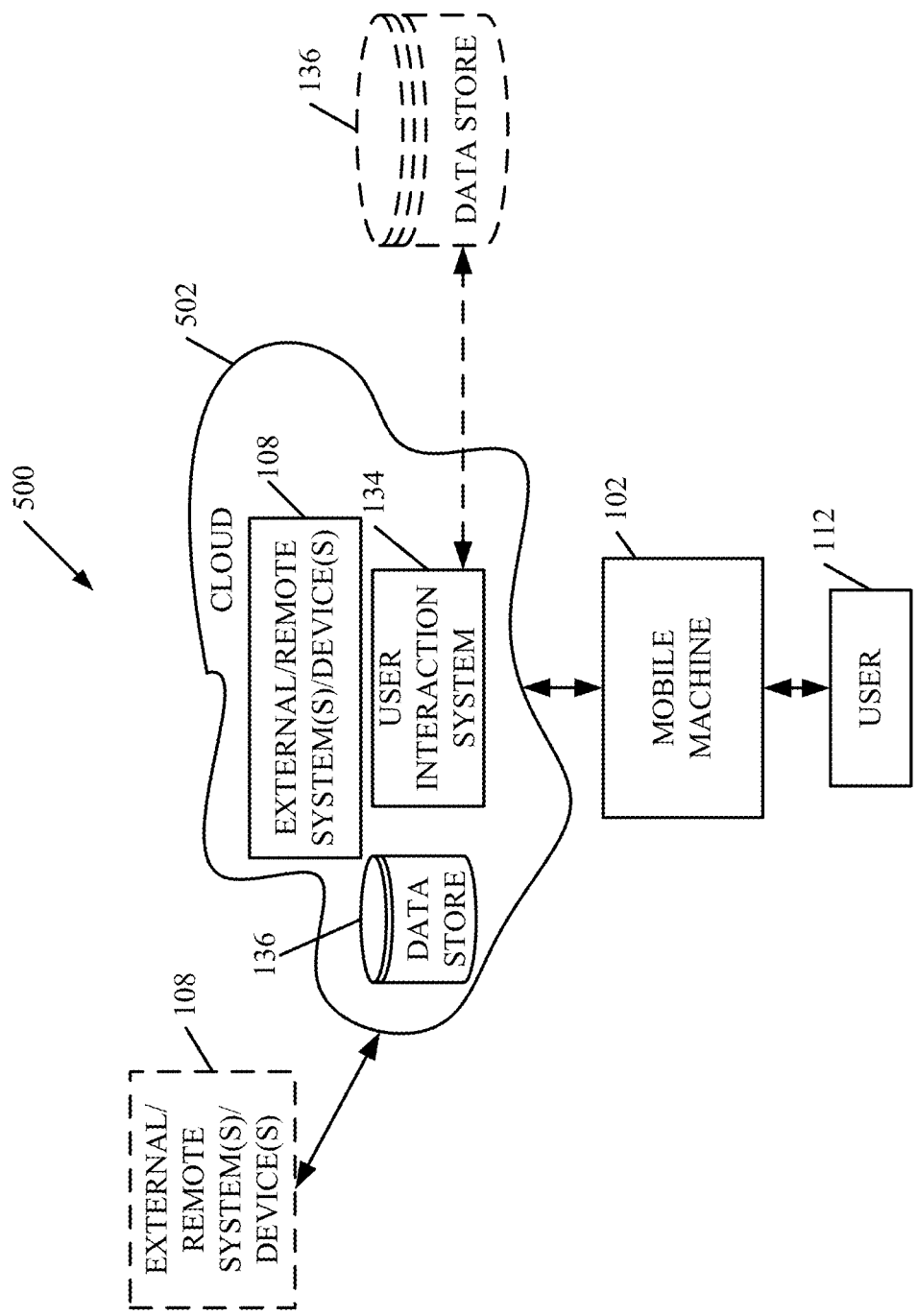
FIG. 8 shows one example of the architecture shown in FIG. 1, in which portions are disposed in a cloud computing architecture.

FIG. 8 is a block diagram of machine 102, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIG. 1 and they are similarly numbered. FIG. 8 specifically shows that user interaction system 134 and data store 136 can be located at a remote server location 502. Therefore machine 102 accesses those systems through remote server location 502.

FIG. 8 also depicts another example of a remote server architecture. FIG. 8 shows that it is also contemplated that some elements of FIG. 1 are disposed at remote server location 502 while others are not. By way of example, data store 136 or external/remote systems(s)/device(s) 108 can be disposed at a location separate from location 502, and accessed through the remote server at location 502. Regardless of where they are located, they can be accessed directly by machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 102 comes close to the fuel truck for fueling, the system automatically collects the information from the machine 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 102 until it enters a covered location. The harvester, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
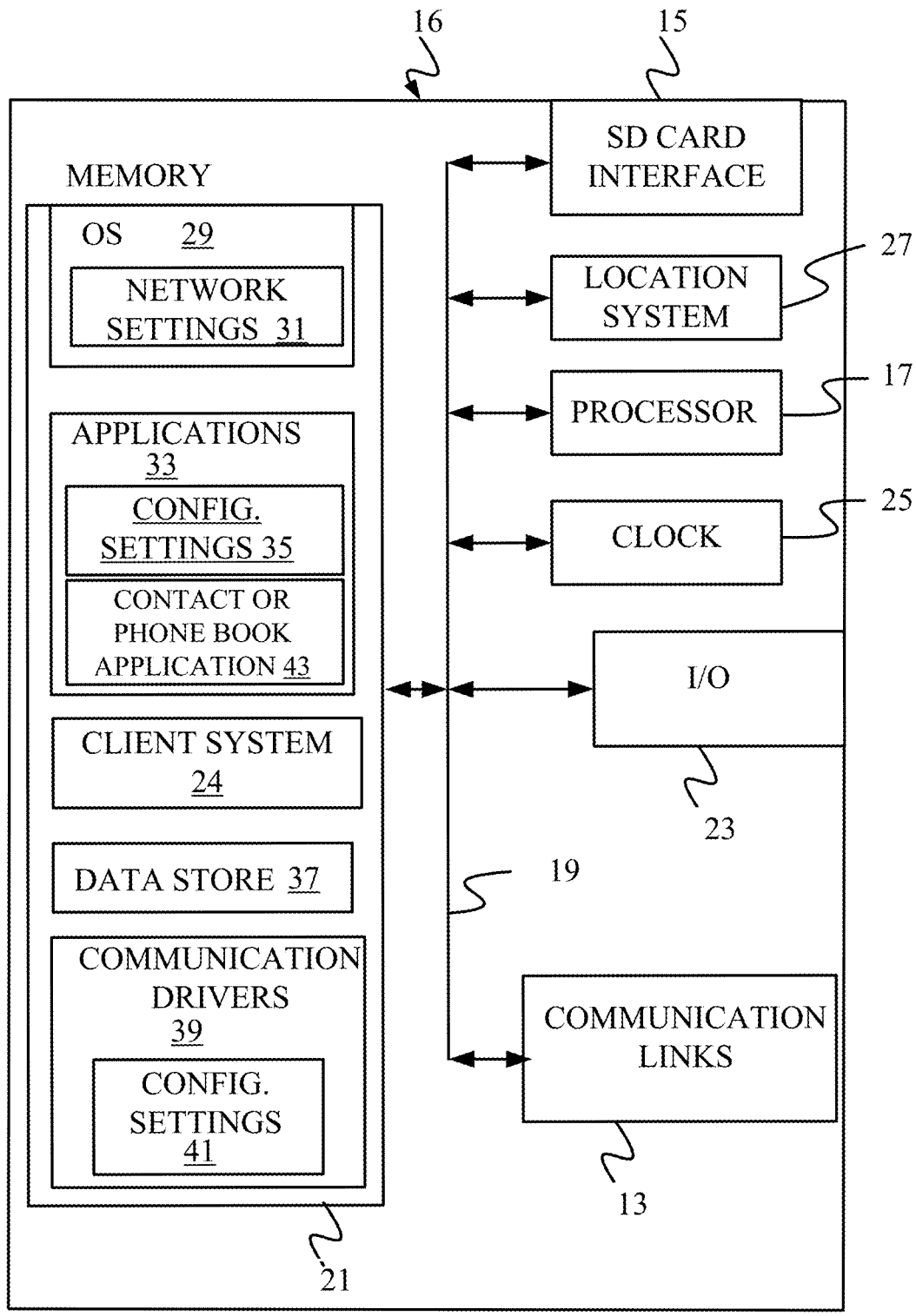
FIGS. 9-11 show examples of mobile devices, in more detail.
Figure 10:
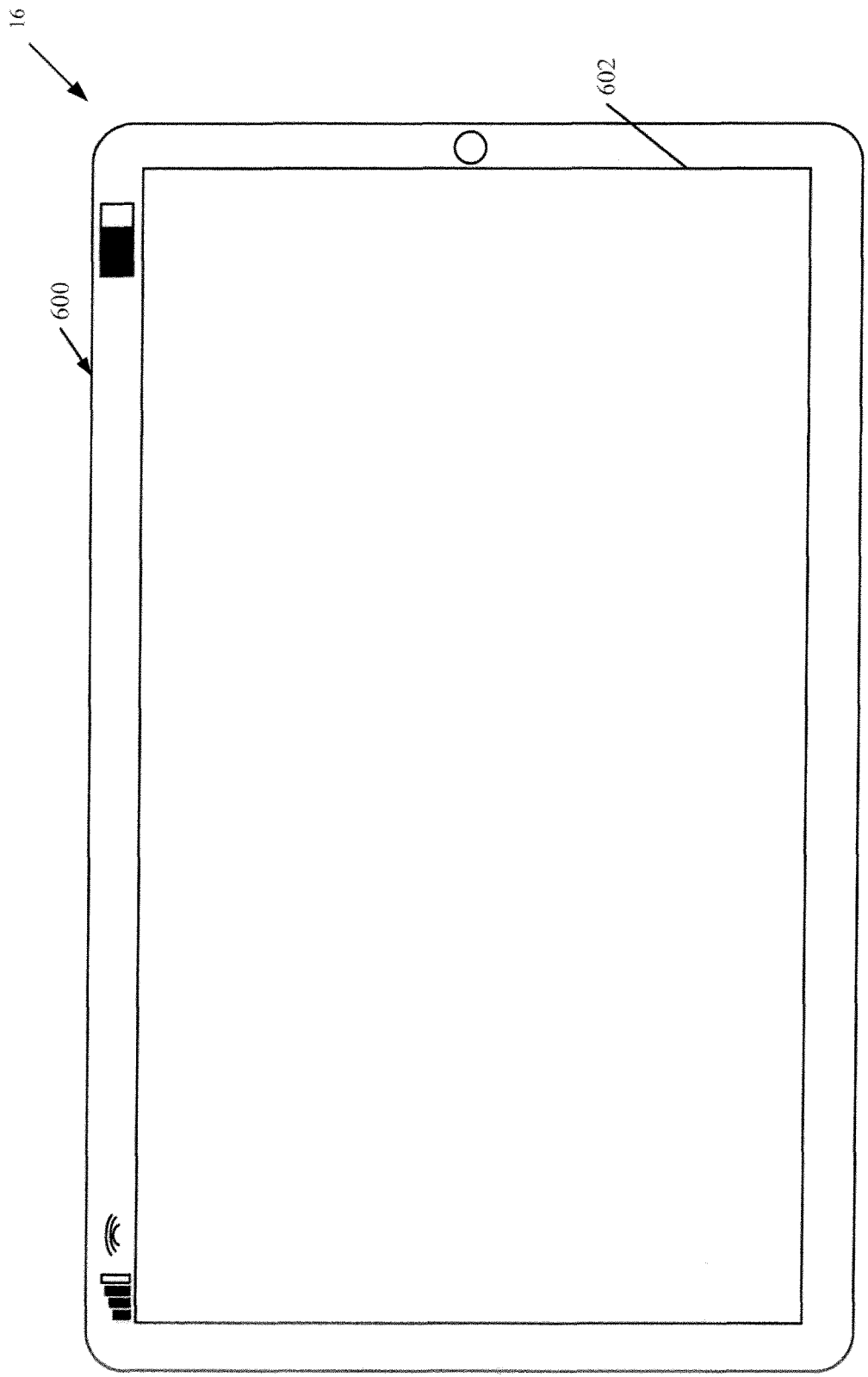
Figure 11:
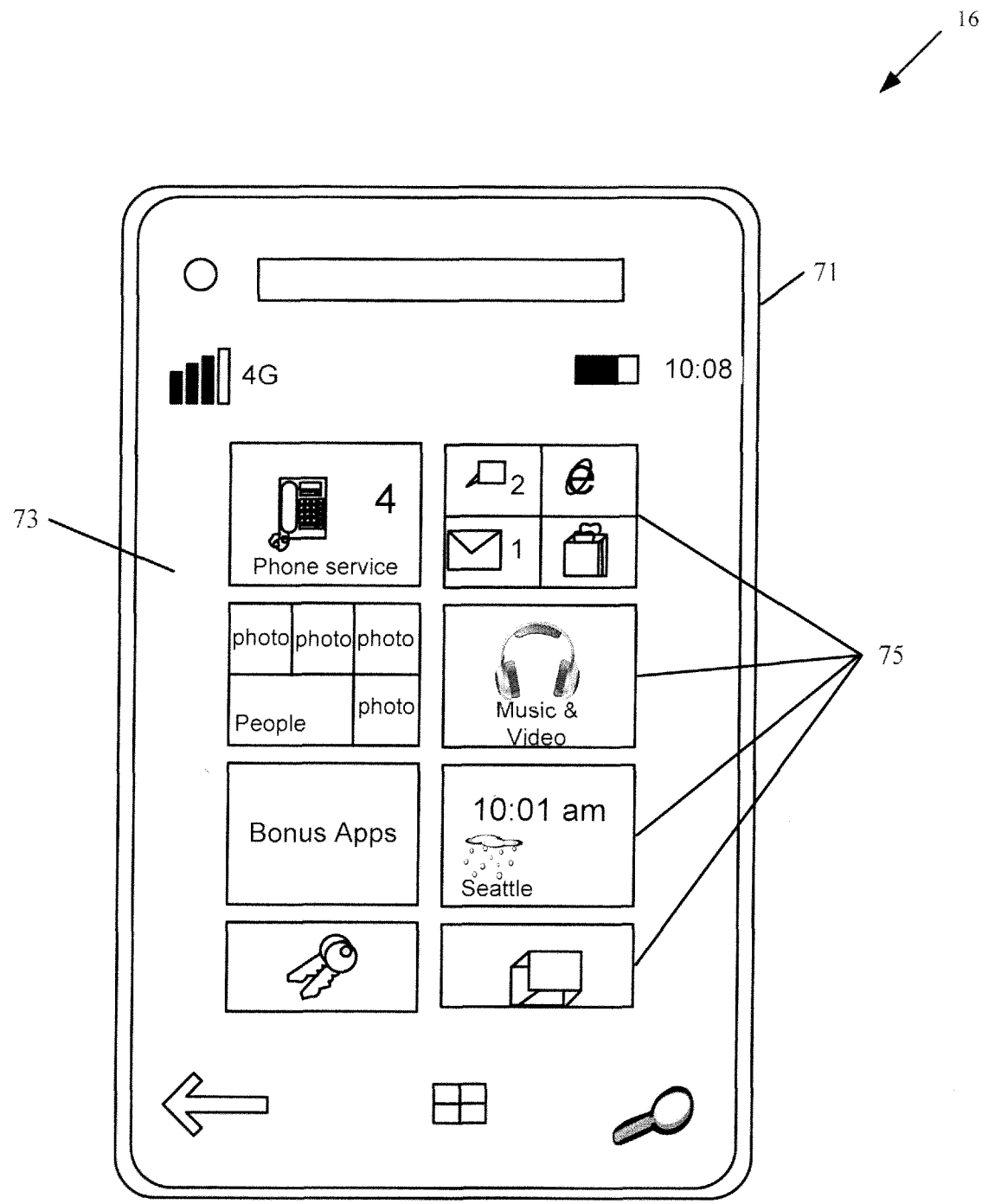

FIG. 9 is a simplified block diagram of one illustrative example of a handheld or mobile computing device that can be used as a user's or client's hand held device 16 (which can function as mobile device 104 discussed above), in which the present system (or parts of it) can be deployed. For instance, a mobile device can be deployed in the operator compartment of machine 102, or used by user 112. FIGS. 9-11 are examples of handheld or mobile devices.

FIG. 9 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 145 from FIG. 1 or processor 212 from FIG. 4) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that device 16 can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of device 16 are possible.

Figure 12:
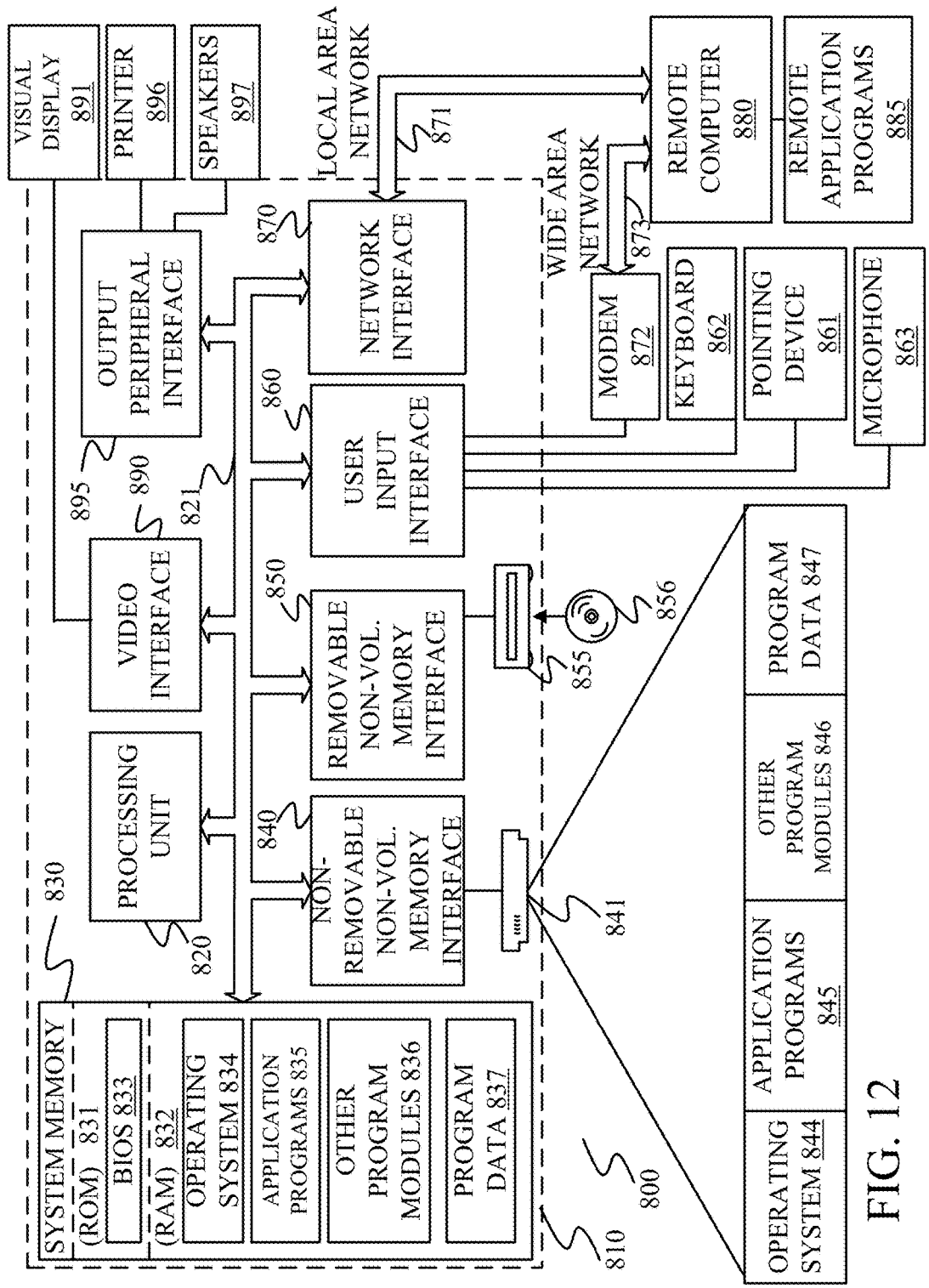
FIG. 12 is a block diagram of one example of a computing environment which can be used in the architectures shown in the previous figures.

FIG. 12 is one example of a computing environment in which elements of FIG. 1, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processor 145 or 212), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile machine, comprising:
a triggering system that generates a trigger output based on sensor data from a plurality of sensor signals, each sensor signal being indicative of a sensed variable; and
a user interaction system that receives the trigger input, identifies an issue to be addressed based on the trigger input and begins executing a process flow by surfacing instructions to perform actions to address the issue, the process flow surfacing a first set of in-cab instructions indicative of in-cab actions to perform to address the identified issue and, if the identified issue is not resolved, then surfacing a set of out-of-cab instructions indicative of out-of-cab actions to perform to address the identified issue.

Example 2 is the mobile machine of any or all previous examples wherein the user interaction system surfaces the in-cab instructions on a first user interface device mounted in a cab of the mobile machine.

Example 3 is the mobile machine of any or all previous examples and further comprising:
a handoff system that, in response to the identified issue being unresolved after the in-cab instructions are surfaced, generates a handoff output to begin running the process flow, by surfacing the out-of-cab instructions to perform the out-of-cab actions, on a second user interface device.

Example 4 is the mobile machine of any or all previous examples wherein the handoff system comprises:
flow position identifier logic that identifies a current position in the process flow; and
position code output logic that generates a position indicator in the handoff output, the position indicator being indicative of the current position.

Example 5 is the mobile machine of any or all previous examples wherein the position code output logic is configured to output the position code as a user perceptible code for entry on the second user interface device to launch the process flow on the second user interface device and begin surfacing the out-of-cab instructions.

Example 6 is the mobile machine of any or all previous examples and further comprising:
a communication component, wherein the handoff system is configured to generate the handoff output using the communication component, communicating with the second user interface device, to automatically launch the process flow on the second user interface device and begin surfacing the out-of-cab instructions.

Example 7 is the mobile machine of any or all previous examples and further comprising:
diagnostic trouble code (DTC) processing logic that generates diagnostic trouble codes (DTCs) based on the sensor data, the triggering system generating the trigger output based on the DTCs generated.

Example 8 is the mobile machine of any or all previous examples wherein the triggering system comprises:
irritation level processing logic that generates an irritation level user input mechanism and detects actuation of the irritation level user input mechanism, the actuation providing an irritation level value indicative of a measure of sensitivity of the triggering system to the DTCs in generating the trigger output.

Example 9 is the mobile machine of any or all previous examples wherein the triggering system comprises:
code frequency detection logic that determines whether to generate the trigger output based on a frequency with which the DTCs are generated and based on the irritation level value.

Example 10 is the mobile machine of any or all previous examples wherein the triggering system comprises:
code pattern detection logic that determines whether to generate the trigger output based on a pattern with which the DTCs are generated and based on the irritation level value.

Example 11 is the mobile machine of any or all previous examples wherein the process flow surfaces a set of questions for operator input and wherein user interaction system comprises:
information gathering logic that automatically accesses information to answer any automatically answerable questions in the set of questions, the user interaction system skipping surfacing of the automatically answerable questions.

Example 12 is the mobile machine of any or all previous examples wherein the user interaction system executes the process flow to surface the instructions to perform the actions according to an order that is based on a complexity of the actions.

Example 13 is a method of controlling a mobile machine, comprising:
detecting an issue related to machine performance of the mobile machine;
triggering execution of a process flow corresponding to the detected issue, the process flow having a first set of instructions corresponding to a first position in the process flow and a second set of instructions corresponding to a second position in the process flow;
executing the process flow on a first computing device by surfacing, on a first user interface device, the first set of instructions to perform a first set of actions to address the detected issue, and detecting a first user input indicative of whether the detected issue is resolved; and
if the detected issue is not resolved, then generating a handoff output launching execution of the process flow, at the second position in the process flow, on a second computing device, by surfacing, on a second user interface device, the second set of instructions indicative of a second set of actions to perform to address the detected issue.

Example 14 is the method of any or all previous examples wherein the mobile machine has an operator compartment and wherein surfacing the first set of instructions comprises:
surfacing a set of in-compartment instructions indicative of actions to perform from within the operator's compartment to address the identified issue.

Example 15 is the method of any or all previous examples wherein surfacing the second set of instructions comprises:
surfacing, on a mobile device, a set of out-of-compartment instructions indicative of actions to perform from outside of the operator's compartment to address the identified issue.

Example 16 is the method of any or all previous examples wherein generating the handoff output comprises:
generating a position indicator in the handoff output, the position indicator being indicative of a current position in the process flow; and
outputting the position code as a user perceptible code for entry on the mobile device to launch the process flow on the mobile device and begin surfacing the out-of-compartment instructions.

Example 17 is the method of any or all previous examples wherein generating the handoff output comprises:
communicating with the mobile device, to automatically launch the process flow on the mobile device and begin surfacing the out-of-compartment instructions.

Example 18 is an agricultural mobile machine, comprising:
an issue detection system that detects an issue relating to operation of the agricultural mobile machine based on sensor data from a plurality of sensor signals, each sensor signal being indicative of a sensed variable;
a triggering system that generates a trigger output based on the detected issue;
a user interaction system that receives the trigger input and begins executing, on a first computing device, a process flow by surfacing, on a first user interface device, instructions to perform actions to address the detected issue, the process flow surfacing a first set of in-cab instructions indicative of in-cab actions to perform to address the detected issue and, if the detected issue is not resolved, then surfacing a set of out-of-cab instructions indicative of out-of-cab actions to perform to address the detected issue; and
a handoff system that, in response to the detected issue being unresolved after the in-cab instructions are surfaced, generates a handoff output to begin executing the process flow on a second computing device, by surfacing the out-of-cab instructions to perform the out-of-cab actions, on a second user interface device.

Example 19 is the agricultural mobile machine of any or all previous examples wherein the triggering system comprises:
irritation level processing logic that generates an irritation level user input mechanism and detects actuation of the irritation level user input mechanism, the actuation providing an irritation level value indicative of a measure of sensitivity of the triggering system to the detected issue in generating the trigger output.

Example 20 is the agricultural mobile machine of any or all previous examples wherein the issue detection system comprises:
diagnostic trouble code (DTC) processing logic that generates diagnostic trouble codes (DTCs) based on the sensor data, the triggering system generating the trigger output based on the DTCs generated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural mobile machine, comprising:
a user interface device mounted in a cab of the agricultural mobile machine;
a triggering system configured to generate a trigger output indicative of an issue to be addressed based on sensor data from a plurality of sensor signals, each sensor signal being indicative of a sensed variable; and
a user interaction system configured to assist an operator in remedying the issue to be addressed, comprising:

issue identifier logic configured to receive the trigger input, and identify the issue to be addressed based on the trigger input;
search and retrieval logic configured to identify and obtain an issue-specific process flow corresponding to the issue to be addressed; and
an execution system configured to begin executing the issue-specific process flow by surfacing instructions to the operator to perform actions to address the issue on the user interface device, wherein the instructions are configured to be broken into a set of in-cab instructions indicative of in-cab actions to perform to address the identified issue and a set of out-of-cab instructions indicative of out-of-cab actions to perform to address the identified issue, detecting whether the identified issue is resolve from the set of in-cab instructions, and, communicating with a mobile user interface device configured to display the set of out-of-cab instructions if the issue to be addressed is not resolved from the set of in-cab instructions.

2. The agricultural mobile machine of claim 1 and further comprising:
a handoff system that, in response to the identified issue being unresolved after the in-cab instructions are surfaced, generates a handoff output to begin running the process flow, by surfacing the out-of-cab instructions to perform the out-of-cab actions, on the mobile user interface device.

3. The agricultural mobile machine of claim 2 wherein the handoff system comprises:
flow position identifier logic that identifies a current position in the process flow; and
position code output logic that generates a position indicator in the handoff output, the position indicator being indicative of the current position and a path through the process flow taken to arrive at the current position.

4. The agricultural mobile machine of claim 3 wherein the position code output logic is configured to output the position code as a user perceptible code for entry on the mobile user interface device to launch the process flow on the mobile user interface device and begin surfacing the out-of-cab instructions.

5. The agricultural mobile machine of claim 3 and further comprising:
a communication component, wherein the handoff system is configured to generate the handoff output using the communication component, communicating with the mobile user interface device, to automatically launch the process flow on the mobile user interface device and begin surfacing the out-of-cab instructions.

6. The agricultural mobile machine of claim 1 and further comprising:
diagnostic trouble code (DTC) processing logic that generates diagnostic trouble codes (DTCs) based on the sensor data, the triggering system generating the trigger output based on the DTCs generated.

7. The agricultural mobile machine of claim 6 wherein the triggering system comprises:
irritation level processing logic that generates an irritation level user input mechanism and detects actuation of the irritation level user input mechanism, the actuation providing an irritation level value indicative of a measure of sensitivity of the triggering system to the DTCs in generating the trigger output.

8. The agricultural mobile machine of claim 7 wherein the triggering system comprises:

code frequency detection logic that determines whether to generate the trigger output based on a frequency with which the DTCs are generated and based on the irritation level value.

9. The agricultural mobile machine of claim 7 wherein the triggering system comprises:
code pattern detection logic that determines whether to generate the trigger output based on a pattern with which the DTCs are generated and based on the irritation level value.

10. The agricultural mobile machine of claim 1 wherein the process flow surfaces a set of questions for operator input and wherein user interaction system comprises:
information gathering logic that automatically accesses information to answer any automatically answerable questions in the set of questions, the user interaction system skipping surfacing of the automatically answerable questions.

11. The agricultural mobile machine of claim 1 wherein the user interaction system executes the process flow to surface the instructions to perform the actions according to an order that is based on a complexity of the actions.

12. A method of controlling a mobile machine, comprising:
controlling an issue detection system to detect an issue related to machine performance of the mobile machine;
controlling a triggering system to trigger execution of a process flow corresponding to the detected issue, the process flow comprising a first set of instructions corresponding to a first position in the process flow and a second set of instructions corresponding to a second position in the process flow;
controlling a user interaction system to execute the process flow on a first computing device by surfacing, on a first user interface device, the first set of instructions to perform a first set of actions to address the detected issue, and detecting a user input indicative of whether the detected issue is resolved; and
if the detected issue is not resolved, then controlling a handoff system to generate a handoff output comprising a position and path indicator indicative of a current position in the process flow and a path taken through the process flow to arrive at the current position, outputting the position and path indicator us a user perceptible code for entry on a second computing device to launch the process flow on the second computing device, and, based on the entry, begin surfacing the second set of instructions indicative of a second set of actions to perform to address the detected issue on the second computing device.

13. The method of claim 12 wherein the mobile machine has an operator compartment and wherein surfacing the first set of instructions comprises:
surfacing a set of in-compartment instructions indicative of actions to perform from within the operator's compartment to address the identified issue.

14. The method of claim 13 wherein surfacing the second set of instructions on the second computing device comprises:
surfacing, on a mobile device, a set of out-of-compartment instructions indicative of actions to perform from outside of the operator's compartment to address the identified issue.

15. An agricultural mobile machine, comprising:
an issue detection system configured to detects an issue relating to operation of the agricultural mobile machine based on sensor data from a plurality of sensor signals, each sensor signal being indicative of a sensed variable;

a triggering system configured to generate a trigger output based on the detected issue;

a user interaction system configured to receive the trigger input and begins executing, on a first computing device, a process flow by surfacing, on a first user interface device, instructions to perform actions to address the detected issue, the process flow surfacing a first set of in-cab instructions indicative of in-cab actions to perform to address the detected issue and, if the detected issue is not resolved, then surfacing a set of out-of-cab instructions indicative of out-of-cab actions to perform to address the detected issue; and a handoff system that, in response to the detected issue being unresolved after the in-cab instructions are surfaced, is configured to generate a handoff output to launch the process flow on a second computing device and to begin executing the process flow on the second computing device, by surfacing the out-of-cab instructions to perform the out-of-cab actions, on a second user interface device corresponding to the second computing device.

16. The agricultural mobile machine of claim 15 wherein the triggering system comprises:

irritation level processing logic that generates an irritation level user input mechanism and detects actuation of the irritation level user input mechanism, the actuation providing an irritation level value indicative of a measure of sensitivity of the triggering system to the detected issue in generating the trigger output.

17. The agricultural mobile machine of claim 16 wherein the issue detection system comprises:

diagnostic trouble code (DTC) processing logic that generates diagnostic trouble codes (DTCs) based on the sensor data, the triggering system generating the trigger output based on the DTCs generated.

* * * * *